(12) United States Patent
Zhou et al.

(10) Patent No.: US 11,973,340 B2
(45) Date of Patent: Apr. 30, 2024

(54) DIRECT-CURRENT TRANSMISSION LINE PROTECTION METHOD AND SYSTEM BASED ON PURE CURRENT CHARACTERISTICS

(71) Applicants: CHINA ELECTRIC POWER RESEARCH INSTITUTE, Beijing (CN); STATE GRID CORPORATION OF CHINA, Beijing (CN)

(72) Inventors: Zexin Zhou, Beijing (CN); Huanzhang Liu, Wuhan (CN); Pengfei Lv, Beijing (CN); Hong Cao, Beijing (CN); Xingguo Wang, Beijing (CN); Siye Ruan, Beijing (CN); Dingxiang Du, Beijing (CN); Yong Li, Wuhan (CN); Guosheng Yang, Beijing (CN); Mingliang Jin, Wuhan (CN)

(73) Assignees: CHINA ELECTRIC POWER RESEARCH INSTITUTE, Beijing (CN); STATE GRID CORPORATION OF CHINA, Beijing (CN)

( * ) Notice: Subject to any disclaimer, the term of this patent is extended or adjusted under 35 U.S.C. 154(b) by 327 days.

(21) Appl. No.: 17/596,826

(22) PCT Filed: Jun. 18, 2020

(86) PCT No.: PCT/CN2020/096763
§ 371 (c)(1),
(2) Date: Dec. 18, 2021

(87) PCT Pub. No.: WO2021/000738
PCT Pub. Date: Jan. 7, 2021

(65) Prior Publication Data
US 2022/0285931 A1    Sep. 8, 2022

(30) Foreign Application Priority Data
Jul. 4, 2019   (CN) .......................... 201910599291.3

(51) Int. Cl.
H02H 7/26   (2006.01)
H02H 1/00   (2006.01)

(52) U.S. Cl.
CPC .......... H02H 7/268 (2013.01); H02H 1/0007 (2013.01); H02H 1/0092 (2013.01)

(58) Field of Classification Search
CPC ..... H02H 7/268; H02H 1/0007; H02H 1/0092
See application file for complete search history.

(56) References Cited

U.S. PATENT DOCUMENTS 8,775,104 B2    7/2014   Marti
2010/0324844 A1   12/2010   Marti
(Continued)

FOREIGN PATENT DOCUMENTS

CN    101662143 A    3/2010
CN    101694936 A    4/2010
(Continued)

OTHER PUBLICATIONS

International Search Report in the international application No. PCT/CN2020/096763, dated Sep. 16, 2020.

*Primary Examiner* — Jue Zhang
*Assistant Examiner* — Lakaisha Jackson
(74) *Attorney, Agent, or Firm* — Syncoda LLC; Feng Ma

(57) ABSTRACT

A line current $i_M(k_0)$ of an M side of a first direct-current transmission line is collected at a moment $k_0$. A line current $i_M(k_0-t_s)$ thereof is collected at $k_0-t_s$. At a moment $k_0$, a differential value $di_M(k_0)$ of a current of the side of the first direct-current transmission line is calculated according to the line current $i_M(k_0)$ and the line current $i_M(k_0-t_s)$. It is determined whether the differential value $di_M(k_0)$ of the current meets a protection enabling criteria. If so, direct-current protection for the M side of the first direct-current transmission line is enabled. A line current $i_M(j)$ of the M (Continued)

side of the first direct-current transmission line is collected at a moment j. A line current $i_M(j-t_s)$ thereof is collected at a moment $j-t_s$. A differential value $di_M(j)$ of the current of the M side of the first direct-current transmission line at the moment j is calculated according to the line current $i_M(j)$ and the line current $i_M(j-t_s)$.

20 Claims, 10 Drawing Sheets

(56) References Cited

U.S. PATENT DOCUMENTS

| | | | |
|---|---|---|---|
| 2019/0280476 A1* | 9/2019 | Fan | G01R 31/08 |
| 2020/0319240 A1* | 10/2020 | Hao | G01R 31/088 |
| 2022/0221201 A1* | 7/2022 | Teraki | F25B 21/00 |
| 2022/0229099 A1* | 7/2022 | Pradhan | H02H 1/0007 |

FOREIGN PATENT DOCUMENTS

| | | |
|---|---|---|
| CN | 103597687 A | 2/2014 |
| CN | 104113045 A | 10/2014 |
| CN | 106208128 A | 12/2016 |
| CN | 106253244 A | 12/2016 |
| CN | 106684842 A | 5/2017 |
| CN | 107112742 A | 8/2017 |
| CN | 107681644 A | 2/2018 |
| CN | 109061397 A | 12/2018 |
| CN | 109787196 A | 5/2019 |
| CN | 110649577 A | 1/2020 |
| WO | 2009076769 A1 | 6/2009 |
| WO | 2014121438 A1 | 8/2014 |

* cited by examiner

DIRECT-CURRENT TRANSMISSION LINE PROTECTION METHOD AND SYSTEM BASED ON PURE CURRENT CHARACTERISTICS

CROSS-REFERENCE TO RELATED APPLICATIONS

This application is a U.S. national stage of International Application No. PCT/CN2020/096763 filed on Jun. 18, 2020, which claims priority to Chinese Patent Application No. 201910599291.3 filed on Jul. 4, 2019. The disclosures of these applications are hereby incorporated by reference in their entireties.

TECHNICAL FIELD

The present disclosure relates to the field of power system relay protection, such as to a method and system for protecting a Direct-Current (DC) transmission line based on pure current characteristics.

BACKGROUND

Compared with an alternating-current transmission system, a high-voltage DC transmission system has advantages of large transmission capacity, long transmission distance, low loss, etc., and has been widely used in long-distance power transmission, large-area power grid interconnection, underground cable power transmission, etc. A high-voltage DC transmission line shoulders the responsibility of transmitting power in a load center time period and an energy producing area, over a long transmission distance under a tough operating condition, with a fault rate of about 50% of faults of the DC system, which is higher than that of another part of a DC system. Therefore, high-performance high-voltage DC transmission line protection is of great significance in terms of improving overall security and stability of a power grid.

Direct-current transmission line protection mainly includes traveling wave protection, differential under voltage protection, longitudinal differential protection, etc. As primary protection of a DC transmission line, the traveling wave protection and the under voltage differential protection may respond to a DC line fault quickly (in 3~5 ms), however with poor endurance toward transition resistance, with action performance prone to impact of a lightning strike, an abnormal large number, and noise interference, and non-fault pole line protection tends to malfunction under impact of inter pole mutual inductance. As backup protection of a DC transmission line, the longitudinal differential protection is well capable of reflecting a high resistance grounding fault. However, in case of an external short circuit, a distributed capacitive current of a long-distance power transmission line will produce a large differential current. To prevent protection malfunction, a long action delay (of hundreds of milliseconds or even seconds) is set.

SUMMARY

The present disclosure provides a method and system for protecting a Direct-Current (DC) transmission line based on pure current characteristics, capable of overcoming the technical problems of poor endurance of traveling wave protection and differential under voltage protection toward transition resistance, with action performance prone to impact of a lightning strike, an abnormal large number, and noise interference, as well as a long action delay of longitudinal differential protection.

Embodiments of the present disclosure provide a method for protecting a Direct-Current (DC) transmission line based on pure current characteristics, including:

collecting a line current $i_M(k_0)$ of an M side of a first DC transmission line at a time point $k_0$ and a line current $i_M(k_0-t_s)$ of the M side of the first DC transmission line at a time point $k_0-t_s$, computing a current difference $di_M(k_0)$ of the M side of the first DC transmission line at the time point $k_0$ according to the line current $i_M(k_0)$ and the line current $i_M(k_0-t_s)$, and determining whether the current difference $di_M(k_0)$ meets a protection starting criterion, the first DC transmission line being one of transmission lines, the M side of the first DC transmission line being one of an inverter side and a rectifier side of the first DC transmission line, the $t_s$ being a sampling interval, the $k_0$ being greater than the $t_s$;

in response to the current difference $di_M(k_0)$ of the M side of the first DC transmission line at the time point $k_0$ meeting the protection starting criterion, starting DC protection at the M side of the first DC transmission line, collecting a line current $i_M(j)$ of the M side of the first DC transmission line at a time point j and a line current $i_M(j-t_s)$ of the M side of the first DC transmission line at a time point $j-t_s$, and computing a current difference $di_M(j)$ of the M side of the first DC transmission line at the time point j according to the line current $i_M(j)$ and the line current $i_M(j-t_s)$; collecting a line current $i_M(k)$ of the M side of the first DC transmission line at a time point k and a line current $i_M(k-t_s)$ of the M side of the first DC transmission line at a time point $k-t_s$, and computing a current difference $di_M(k)$ of the M side of the first DC transmission line at the time point k according to the line current $i_M(k)$ and the line current $i_M(k-t_s)$; collecting a line current $i_N(j-T_{tran})$ of an N side of the first DC transmission line at a time point $j-T_{tran}$ and a line current $i_N(j-t_s-T_{tran})$ of the N side of the first DC transmission line at a time point $j-t_s-T_{tran}$, and computing a current difference $di_N(j-T_{tran})$ of the N side of the first DC transmission line at the time point $j-T_{tran}$ according to the line current $i_N(j-T_{tran})$ and the line current $i_N(j-t_s-T_{tran})$; collecting a line current $i_M'(j)$ of an M side of a second DC transmission line at the time point j and a of the $i_M'(j-t_s)$ side of the second DC transmission line at a time point $j-t_s$, computing a current difference $di_M'(j)$ of the M side of the second DC transmission line at the time point j according to the line current $i_M'(j)$ and the line current $i_M'(j-t_s)$, computing a current change $\Delta i_M(k)$ of the M side of the first DC transmission line at the time point k according to the current difference $di_M(j)$ of the M side of the first DC transmission line, and computing a current change $\Delta i_N(k-T_{tran})$ of the N side of the first DC transmission line at the time point $k-T_{tran}$ according to the current difference $di_N(j-T_{tran})$ of the N side of the first DC transmission line, the time point of starting DC protection at the M side of the first DC transmission line being denoted as $t_0$, the second DC transmission line being a DC transmission line other than the first DC transmission line, the M side of the second DC transmission line being located on a same side as the M side of the first DC transmission line, the N side of the first DC transmission line being opposite the M side of the first DC transmission line, the $T_{tran}$ being a DC line transmission channel delay, $t_0 \le j \le k$;

computing a difference accumulating action amount $i_\Sigma(t)$ of the first DC transmission line according to the current difference $di_M(k)$ of the M side of the first DC transmission line and the current change $\Delta i_N(k-T_{tran})$ of the N side of the first DC transmission line, computing a difference accumulating threshold $i_{set\Sigma}$ of the first DC transmission line according to the current difference $di_M(k)$ of the M side of the first DC transmission line, and determining whether the difference accumulating action amount $i_\Sigma(t)$ of the first DC transmission line and the difference accumulating threshold $i_{set\Sigma}$ of the first DC transmission line meet an opposite-end boosted differential current accumulation criterion preset, the t being a data collecting time point after start of DC protection at the M side of the first DC transmission line, $t_0 \leq k \leq t$;

computing a direction action amount $i_{\Sigma A}(t)$ of the first DC transmission line according to the current change $\Delta i_M(k)$ of the M side of the first DC transmission line and the current change $\Delta i_N(k-T_{tran})$ of the N side of the first DC transmission line, and determining whether the direction action amount $i_{\Sigma A}(t)$ of the first DC transmission line meets an accumulation low value direction criterion of an opposite-end boosted change current and an accumulation high value direction criterion of the opposite-end boosted change current preset;

determining, within a time period $t_0 \sim t_{limit}$, whether the current difference $di_M(j)$ of the M side of the first DC transmission line and the current difference $di_M'(j)$ of the M side of the second DC transmission line meet a first pole amplitude-comparison change current pole selecting criterion and a second pole amplitude-comparison change current pole selecting criterion preset, determining, within a time period $t_0 \sim t_f$ whether the current difference $di_M(j)$ of the M side of the first DC transmission line meets the first pole amplitude-comparison change current pole selecting criterion preset, determining, after the time point $t_f$ whether the direction action amount $i_{\Sigma A}(t)$ of the first DC transmission line meets a ratio braked current pole selecting criterion, where in response to that the first pole amplitude-comparison change current pole selecting criterion and the second pole amplitude-comparison change current pole selecting criterion are not met within the time period $t_0 \sim t_{limit}$, that the first pole amplitude-comparison change current pole selecting criterion is met at one time point within the time period $t_0 \sim t_f$, or that the ratio braked current pole selecting criterion is met at a time point after the time point $t_f$, a stage-wise current pole selecting criterion is met, the first pole being the M side of the first DC transmission line, the second pole being the M side of the second DC transmission line, the $t_{limit}$ and the $t_f$ being two time points after the $t_0$, $t_f > t_{limit}$;

computing a difference quantity $i_A(k)$ of the M side of the first DC transmission line at the time point k according to the current difference $di_M(k)$ of the M side of the first DC transmission line and the current change $\Delta i_N(k-T_{tran})$ of the N side of the first DC transmission line, determining a reverse difference quantity $i_A'(k)$ of the M side of the first DC transmission line at the time point k based on the difference quantity $i_A(k)$, and determining whether the reverse difference quantity $i_A'(k)$ of the M side of the first DC transmission line meets a difference accumulation large number preventing protection criterion preset;

computing a large number preventing change $i_z(k)$ of the first DC transmission line at the time point k according to the current change $\Delta i_M(k)$ of the M side and the current change $\Delta i_N(k-T_{tran})$ of the N side of the first DC transmission line, and determining whether the large number preventing change $i_z(k)$ of the first DC transmission line meets a current change large number preventing protection criterion; and in response to that the opposite-end boosted differential current accumulation criterion, the accumulation high value direction criterion of the opposite-end boosted change current, and the difference accumulation large number preventing protection criterion are all met at the time point t, and within a time period $t_0 \sim t$ a number of sampling points meeting the current change large number preventing protection criterion is greater than a preset point number threshold and a number of sampling points not meeting the current change large number preventing protection criterion, or in response to that the opposite-end boosted differential current accumulation criterion, the accumulation low value direction criterion of the opposite-end boosted change current, the stage-wise current pole selecting criterion, and the difference accumulation large number preventing protection criterion are all met at the time point t, and within the time period $t_0 \sim t$ the number of sampling points meeting the current change large number preventing protection criterion is greater than the preset point number threshold and the number of sampling points not meeting the current change large number preventing protection criterion, exporting a protection action on the M side of the first DC transmission line.

Embodiments of the present disclosure further provide a system for protecting a Direct-Current (DC) transmission line based on pure current characteristics, including an initial setting unit, a data collecting unit, a data processing unit, a protection starting unit, and a protection exporting unit.

The initial setting unit is configured to determine a first DC transmission line, a second DC transmission line, an M side and an N side of the first DC transmission line, and an M side of the second DC transmission line, set a protection starting criterion, an opposite-end boosted differential current accumulation criterion, an accumulation high value direction criterion of an opposite-end boosted change current, an accumulation low value direction criterion of the opposite-end boosted change current, a first pole amplitude-comparison change current pole selecting criterion, a second pole amplitude-comparison change current pole selecting criterion, a ratio braked current pole selecting criterion, a difference accumulation large number preventing protection criterion, and a current change large number preventing protection criterion, and assign values to a sampling point number threshold and an assignable parameter in the multiple criteria. The first DC transmission line is one of transmission lines. The second DC transmission line is a DC transmission line other than the first DC transmission line. The M side of the first DC transmission line is one of an inverter side and a rectifier side of the first DC transmission line. The M side of the second DC transmission line is located on a same side as the M side of the first DC transmission line. The N side of the first DC transmission line is opposite the M side of the first DC transmission line.

The data collecting unit is configured to collect, in real time, line currents of the M side and the N side of the first DC transmission line, as well as a line current of the M side of the second DC transmission line.

The data processing unit is configured to compute a current difference of the M side of the first DC transmission line according to the line current of the M side of the first DC transmission line, compute a current difference of the N side of the first DC transmission line according to the line current of the N side of the first DC transmission line, compute a current difference of the M side of the second DC transmission line according to the line current of the M side of the second DC transmission line, compute a current change of the M side of the first DC transmission line according to the current difference of the M side of the first DC transmission line, compute a current change of the N side of the first DC transmission line according to the current difference of the N side of the first DC transmission line, and determine, according to a computed result, whether the multiple criteria in the initial setting unit are met.

The protection starting unit is configured to start DC protection at the M side of the first DC transmission line in response to that the protection starting criterion is met. The time point of starting DC protection at the M side of the first DC transmission line is denoted as $t_0$.

The protection exporting unit is configured to export a protection action on the M side of the first DC transmission line after start of DC protection at the M side of the first DC transmission line, in response to that the opposite-end boosted differential current accumulation criterion, the accumulation high value direction criterion of the opposite-end boosted change current, and the difference accumulation large number preventing protection criterion are all met at the time point t, and within a time period $t_0$~t a number of sampling points meeting the current change large number preventing protection criterion is greater than a preset point number threshold and a number of sampling points not meeting the current change large number preventing protection criterion, or in response to that the opposite-end boosted differential current accumulation criterion, the accumulation low value direction criterion of the opposite-end boosted change current, the stage-wise current pole selecting criterion, and the difference accumulation large number preventing protection criterion are all met at the time point t, and within the time period $t_0$~t the number of sampling points meeting the current change large number preventing protection criterion is greater than the preset point number threshold and the number of sampling points not meeting the current change large number preventing protection criterion. When the first pole amplitude-comparison change current pole selecting criterion and the second pole amplitude-comparison change current pole selecting criterion are not met within the time period $t_0$~$t_{limit}$, the first pole amplitude-comparison change current pole selecting criterion is met at one time point within the time period $t_0$~$t_f$, or the ratio braked current pole selecting criterion is met at a time point after the time point $t_f$, the stage-wise current pole selecting criterion is met. The first pole is the M side of the first DC transmission line. The second pole is the M side of the second DC transmission line. The t is a time point of sampling by the data collecting unit after start of DC protection at the M side of the first DC transmission line. The $t_{limit}$ and the $t_f$ are two time points after the $t_0$. $t_f > t_{limit}$.

DETAILED DESCRIPTION

Figure 1:
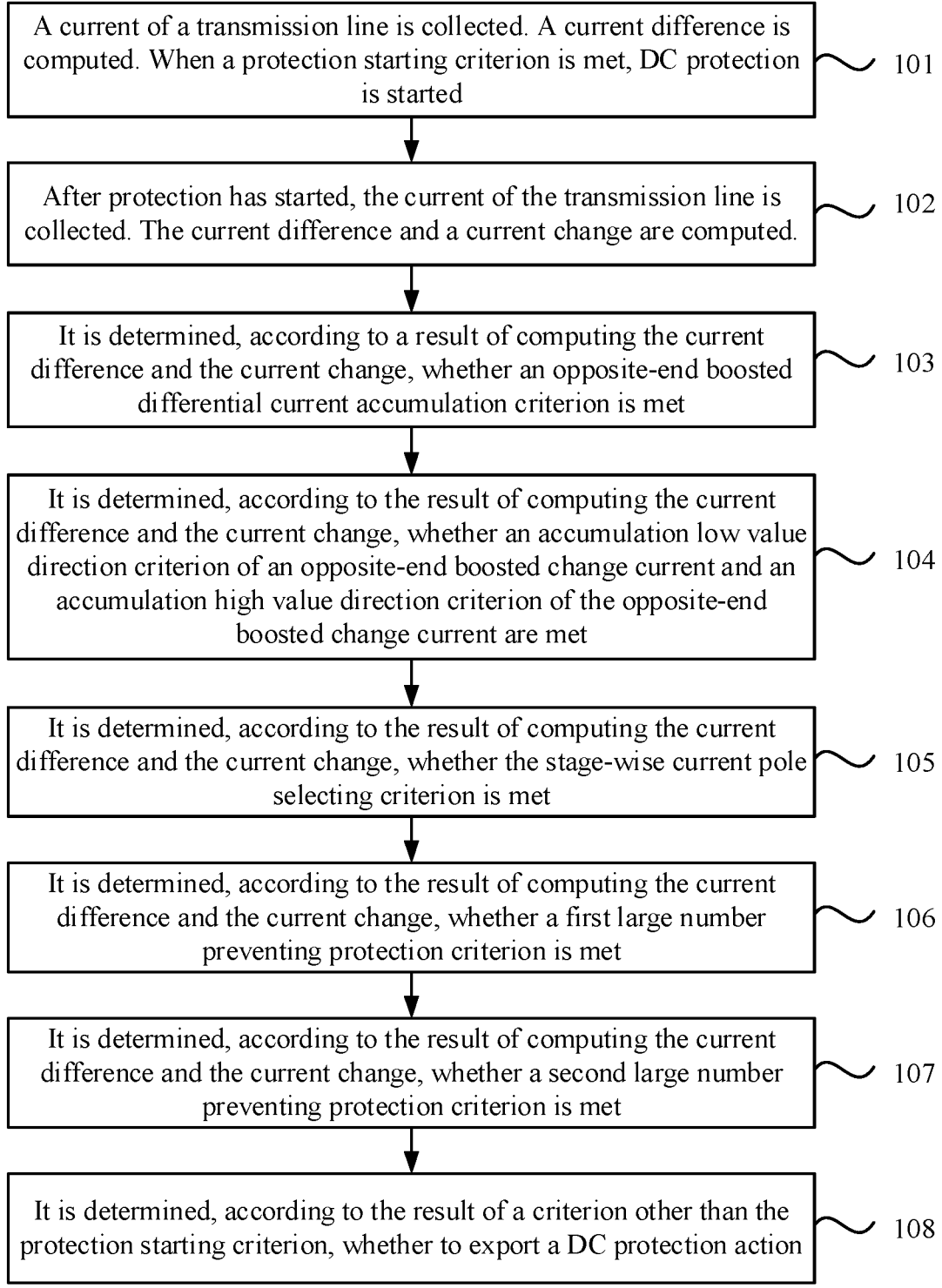
FIG. 1 is a flowchart of a method for protecting a Direct-Current (DC) transmission line based on pure current characteristics according to an implementation of the present disclosure.

Illustrative implementations of the present disclosure are introduced with reference to the drawings. The present disclosure may be implemented in many different forms, and is not limited to embodiments described here. The embodiments are provided to disclose the present disclosure. Terms indicated in illustrative implementations in the drawings do not limit the present disclosure. In the drawings, identical reference signs are used for identical units/elements.

Unless stated otherwise, terms (including scientific and technical terms) used here have meanings as commonly understood by a skilled person in the art. A term defined by a commonly used dictionary shall be understood as having a meaning consistent with a context of a related field thereof, instead of an idealized or overly formal meaning.

FIG. 1 is a flowchart of a method for protecting a Direct-Current (DC) transmission line based on pure current characteristics according to an implementation of the present disclosure. As shown in FIG. 1, the method for protecting a DC transmission line based on pure current characteristics according to the implementation starts from S101.

In S101, a line current $i_M(k_0)$ of an M side of a first DC transmission line at a time point $k_0$ and a line current $i_M(k_0-t_s)$ of the M side of the first DC) transmission line at a time point $k_0-t_s$ are collected. A current difference $di_M(k_0)$ of the M side of the first DC transmission line at the time point $k_0$ is computed) according to the line current $i_M(k_0)$ and the line current $i_M(k_0-t_s)$. It is determined whether the current difference $di_M(k_0)$ meets a protection starting criterion. The first DC transmission line is any one of transmission lines. The M side of the first DC transmission line is one of an inverter side and a rectifier side of the first DC transmission line. The $t_s$ is a sampling interval.

Figure 2:
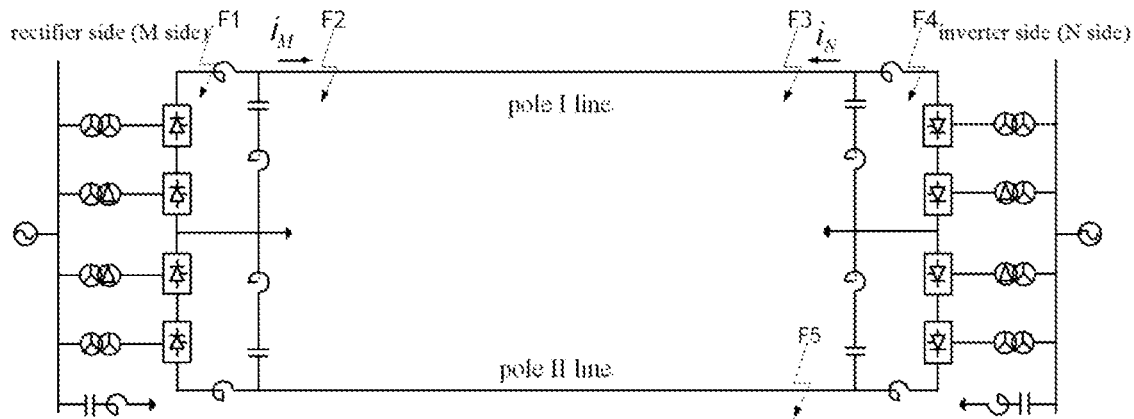
FIG. 2 is a diagram of a DC transmission line according to an implementation of the present disclosure.

FIG. 2 is a diagram of a DC transmission line according to an implementation of the present disclosure. As shown in FIG. 2, in the implementation, the first DC transmission line is a pole I line. The M side of the first DC transmission line may be a rectifier side of the pole I line. An N side of the first DC transmission line may be an inverter side of the pole I line. $i_M$ may be the current value of the M side of the DC line. $i_N$ may be the current value of the N side of the DC line. The positive direction of the current may be a pole bus pointing line.

The current difference $di_M(k_0)$ of the M side of the first DC transmission line at the time point $k_0$ may be computed according to the line currents $i_M(k_0)$ and $i_M(k_0-t_s)$ of the M side of the first DC transmission line at the time point $k_0$; and when the current difference $di_M(k_0)$ meets the protection starting criterion, DC protection at the M side may be started, as follows.

The current difference $di_M(k_0)$ of the M side of the first DC transmission line at the time point $k_0$ may be computed according to the line currents $i_M(k_0)$ and $i_M(k_0-t_s)$ of the M side of the first DC transmission line at the time point $k_0$, by $$di_M(k_0) = i_M(k_0) - i_M(k_0-t_s).$$

The $t_s$ is the sampling interval.

It may be determined whether the current difference $di_M(k_0)$ meets the protection starting criterion. The protection starting criterion is $$|di_M(k_0)| > i_{set0}.$$

The $i_{set0}$ may be a starting threshold. The $i_{set0}$ may be set to sense a high resistance fault at an end of the line. For example, a ±500 kV system is set to sense a transition resistance of 800 ohms at an end of the line. That is, the high resistance fault may be generated at the end of the first DC transmission line. The $|di_M(k_0)|$ may be computed. The $i_{set0}$ may be acquired by dividing $|di_M(k_0)|$ by a coefficient greater than 1.

In S102, when the current difference $di_M(k_0)$ of the M side of the first DC transmission line at the time point $k_0$ meeting the protection starting criterion, DC protection at the M side may be started. A line current $i_M(j)$ of the M side of the first DC transmission line at a time point j and a line current $i_M(j-t_s)$ of the M side of the first DC transmission line at a time point $j-t_s$ may be collected. A current difference $di_M(j)$ of the M side of the first DC transmission line at the time point j may be computed according to the line currents $i_M(j)$ and $i_M(j-t_s)$. A line current $i_M(k)$ of the M side of the first DC transmission line at a time point k and a line current $i_M(k-t_s)$ of the M side of the first DC transmission line at a time point $k-t_s$ may be collected. A current difference $di_M(k)$ of the M side of the first DC transmission line at the time point k may be computed according to the line currents $i_M(k)$ and $i_M(k-t_s)$. A line current $i_N(j-T_{tran})$ of an N side of the first DC transmission line at a time point $j-T_{tran}$ and a line current $i_N(j-t_s-T_{tran})$ of the N side of the first DC transmission line at a time point is $j-t_s-T_{tran}$ may be collected. A current difference $di_N(j-T_{tran})$ of the N side of the first DC transmission line at the time point $j-T_{tran}$ may be computed according to the line currents $i_N(j-T_{tran})$ and $i_N(j-t_s-T_{tran})$. A line current $i_{M'}(j)$ of an M side of a second DC transmission line at the time point j and a line current $i_{M'}(j-t_s)$ of the M side of the second DC transmission line at a time point $j-t_s$ may be collected. A current difference $di_{M'}(j)$ of the M side of the second DC transmission line at the time point j may be computed according to the line currents $i_{M'}(j)$ and $i_{M'}(j-t_s)$. A current change $\Delta i_M(k)$ of the M side of the first DC transmission line at the time point k may be computed according to the current difference $di_M(j)$ of the M side of the first DC transmission line at the time point j. A current change $\Delta i_N(k-T_{tran})$ of the N side of the first DC transmission line at the time point $k-T_{tran}$ may be computed according to the current difference $di_N(j-T_{tran})$ of the N side of the first DC transmission line at the time point $j-T_{tran}$. The time point of starting protection may be denoted as $t_0$. The second DC transmission line may be a DC transmission line other than the first DC transmission line. The M side of the second DC transmission line may be located on a same side as the M side of the first DC transmission line. The N side of the first DC transmission line may be opposite the M side of the first DC transmission line. The $T_{tran}$ may be a DC line transmission channel delay. $t_0 \leq j \leq k$. $t_0 \leq k \leq t$.

The current difference $di_M(j)$ of the M side of the first DC transmission line at the time point j may be computed according to the line currents $i_M(j)$ and $i_M(j-t_s)$, as follows.

$$di_M(j) = i_M(j) - i_M(j-t_s).$$

The current difference $di_M(k)$ of the M side of the first DC transmission line at the time point k may be computed according to the line currents $i_M(k)$ and $i_M(k-t_s)$, as follows.

$$di_M(k) = i_M(k) - (k-t_s).$$

The current difference $di_N(j-T_{tran})$ of the N side of the first DC transmission line at the time point $j-T_{tran}$ may be computed according to the line currents $i_N(j-T_{tran})$ and $i_N(j-t_s-T_{tran})$ as follows.

$$di_N(j-T_{tran})=i_N(j-T_{tran})-i_N(j-t_s-T_{tran}).$$

The current difference $di_M'(j)$ of the M side of the second DC transmission line at the time point j may be computed according to the line currents $i_M'(j)$ and $i_M'(j-t_s)$, as follows.

$$di_M'(j)=i_M'(j)-i_M'(j-t_s).$$

The current change $\Delta i_M(k)$ of the M side of the first DC transmission line at the time point k may be computed according to the current difference $di_M(j)$ of the M side of the first DC transmission line at the time point j, as follows.

$$\Delta i_M(k) = \sum_{j=t_0}^{k} di_M(j).$$

The current change $\Delta i_N(k-T_{tran})$ of the N side of the first DC transmission line at the time point $k-T_{tran}$ may be computed according to the current difference $di_N(j-T_{tran})$ of the N side of the first DC transmission line at the time point $j-T_{tran}$, as follows.

$$\Delta i_N(k-T_{tran}) = \sum_{j=t_0}^{k} di_N(j-T_{tran}).$$

$t_0 \leq j \leq k$. $t_0 \leq k \leq t$. The $t_s$ is a sampling interval. The $T_{tran}$ is a DC line transmission channel delay.

In S103, a difference accumulating action amount $i_\Sigma(t)$ of the first DC transmission line may be computed according to the current difference $di_M(k)$ of the M side of the first DC transmission line and the current change $\Delta i_N(k-T_{tran})$ of the N side of the first DC transmission line. A difference accumulating threshold $i_{setz}$ of the first DC transmission line may be computed according to the current difference $di_M(k)$ of the M side of the first DC transmission line. It may be determined whether the difference accumulating threshold $i_{setz}$ and the difference accumulating action amount $i_\Sigma(t)$ of the first DC transmission line meet an opposite-end boosted differential current accumulation criterion preset. $t_0 \leq k \leq t$.

The difference accumulating action amount $i_\Sigma(t)$ of the first DC transmission line may be computed according to the current change $\Delta i_N(k-T_{tran})$ of the N side of the first DC transmission line and the current difference $di_M(k)$ of the M side of the first DC transmission line at the time point k; the difference accumulating threshold $i_{setz}$ of the first DC transmission line may be computed according to the current difference $di_M(k)$ of the M side of the first DC transmission line at the time point k; and it may be determined whether the difference accumulating threshold $i_{setz}$ and the difference accumulating action amount $i_\Sigma(t)$ of the first DC transmission line at the time point t meet the opposite-end boosted differential current accumulation criterion preset, as follows.

The difference accumulating action amount $i_\Sigma(t)$ of the first DC transmission line at the time point t may be computed according to the current change $\Delta i_N(k-T_{tran})$ of the N side of the first DC transmission line and the current difference $di_M(k)$ of the M side of the first DC transmission line at the time point k, as follows.

$$i_\Sigma(t) = \frac{1}{n} \sum_{k=t_0}^{t} (|di_M(k)| + \Delta i_N(k - T_{tran})).$$

Then n may be a number of sampling points in the time period $t_{0-t}$. The $|di_M(k)|$ may be an absolute value of the current difference $di_M(k)$ of the M side of the first DC transmission line at the time point k.

The difference accumulating threshold $i_{setz}$ of the first DC transmission line may be computed according to the current difference $di_M(k)$ of the M side of the first DC transmission line, as follows.

$$i_{setz} = k_k(i_{set1} + \gamma).$$

$$\gamma = \rho \sum_{k=t_0}^{t_0+T} di_M^-(k).$$

$$k_k = \lambda \frac{i_{set1}}{i_{set1} + \rho \sum_{k=t_0}^{t_0+T} di_M^-(k)}.$$

$$\rho = \frac{i_{set1}}{\sqrt{\left(\frac{i_{set1}}{\rho_{max}}\right)^2 + \left(\sum_{k=t_0}^{t_0+T'} di_M^-(k)\right)^2}}.$$

$$\begin{cases} di_M^-(k) = di_M(k) & di_M(k) < 0 \\ di_M^-(k) = 0 & di_M(k) \geq 0 \end{cases}.$$

The $k_k$ may be a reliability coefficient. The $i_{set1}$ may be a fixed threshold, and may be determined as a maximum value of the difference accumulating action amount within a time period $T_0$ after an out-of-zone metallic fault. $T_0 < 50$ ms is suggested. The $\gamma$ may be a floating threshold of a negative slope current. The $di_M^-(k)$ may be the negative slope current. The T may be a floating threshold computing window. $T < 5$ ms is suggested. The $\rho$ may be a floating threshold coefficient. The $\rho_{max}$ may be a proportionality constant. $\rho_{max} > 1$. The T' may be a fixed computing window. $T' > T$. The $\lambda$ may be a margin factor. $\lambda > 1$.

It may be determined whether the difference accumulating threshold setz and the difference accumulating action amount $i_\Sigma(t)$ of the first DC transmission line meet the opposite-end boosted differential current accumulation criterion preset. The opposite-end boosted differential current accumulation criterion is as follows.

$$i_\Sigma(t) > i_{setz}.$$

Figure 3:
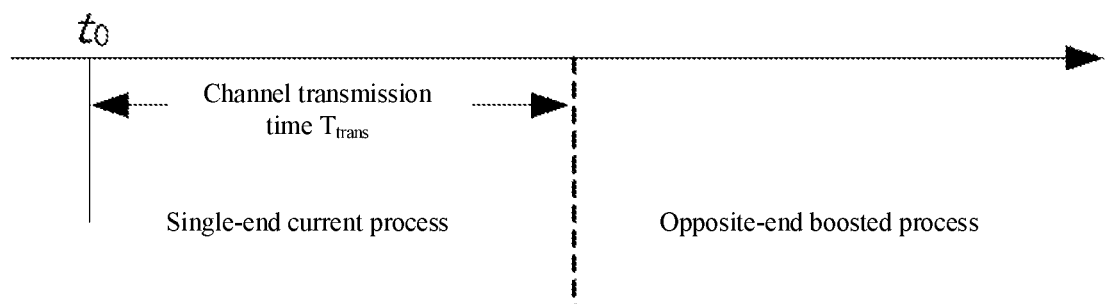
FIG. 3 is a diagram of timing of opposite-end boost of a first DC transmission line according to an implementation of the present disclosure.

FIG. 3 is a diagram of timing of opposite-end boost of a first DC transmission line according to an implementation of the present disclosure. As shown in FIG. 3, the time point of starting DC protection at the M side of the first DC transmission line may be denoted as $t_0$. As the current change of the N side of the first DC transmission line adopts the value at the time point $k-T_{tran}$, for the criterion on the M side, the current change $\Delta i_N(k-T_{tran})$ of the N side of the first DC transmission line is 0 within the time period $T_{tran}$ after the protection has been started. The criterion uses just current quantities at a single end of the M side of the first DC transmission line, which is referred to as a single-end current process. After the time period $T_{tran}$ after the protection has been started, the change of the N side of the first DC transmission line has arrived. In case of an in-zone fault, the current change $\Delta i_N(k-T_{tran})$ of the N side of the first DC transmission line is greater than 0. When superimposed with the current change $\Delta i_N(k-T_{tran})$, the action amount is greater, and it is easier to meet the criterion. When a fault occurs outside the area of the end, the current change $\Delta i_N(k-T_{tran})$ of the N side of the first DC transmission line is less than 0. When superimposed with the $\Delta i_N(k-T_{tran})$, the action amount is less, and it is more difficult to meet the criterion. It is seen that for DC protection of the M-side of the first DC transmission line, arrival of the change of the N side of the first DC transmission line may improve the overall performance of the criterion. Therefore, the time after the time period $T_{tran}$ after start of the protection is referred to as an opposite-end boosted process.

In S104, a direction action amount $i_{\Sigma A}(t)$ of the first DC transmission line may be computed according to the current change $\Delta i_M(k)$ of the M side of the first DC transmission line and the current change $\Delta i_N(k-T_{tran})$ of the N side of the first DC transmission line. It may be determined whether the direction action amount $i_{\Sigma A}(t)$ of the first DC transmission line meets an accumulation low value direction criterion of an opposite-end boosted change current and an accumulation high value direction criterion of the opposite-end boosted change current preset.

The direction action amount $i_{\Sigma A}(t)$ of the first DC transmission line may be computed according to the current change $\Delta i_M(k)$ of the M side of the first DC transmission line and the current change $\Delta i_N(k-T_{tran})$ of the N side of the first DC transmission line, and it may be determined whether the direction action amount $i_{\Sigma A}(t)$ of the first DC transmission line meets the accumulation low value direction criterion of the opposite-end boosted change current and the accumulation high value direction criterion of the opposite-end boosted change current preset, as follows.

The direction action amount $i_{\Sigma A}(t)$ of the first DC transmission line may be computed according to the current change $\Delta i_M(k)$ of the M side of the first DC transmission line and the current change $\Delta i_N(k-T_{tran})$ of the N side of the first DC transmission line, by $$i_{\Sigma A}(t) = \frac{1}{n}\sum_{k=t_0}^{t}(\Delta i_M(k) + \Delta i_N(k - T_{tran})).$$

Then n may be a number of sampling points in the time period $t_{0-t}$.

It may be determined whether the direction action amount $i_{\Sigma A}(t)$ of the first DC transmission line meets the accumulation low value direction criterion of the opposite-end boosted change current and the accumulation high value direction criterion of the opposite-end boosted change current preset. The accumulation high value direction criterion of the opposite-end boosted change current may be as follows.

$i_{\Sigma A}(t) > i_{set2H}.$

The accumulation low value direction criterion of the opposite-end boosted change current may be as follows.

$i_{\Sigma A}(t) > i_{set2L}.$

The $i_{set2H}$ may be a direction determining high value. The $i_{set2L}$ may be a direction determining low value. The $i_{set2H}$ may be set according to a metallic fault at an end of the second DC transmission line. That is, a metallic fault may be generated at the end of the second DC transmission line, in which case the direction action amount $i_{\Sigma A}(t)$ of the first DC transmission line may be computed, and the $i_{set2H}$ may be acquired by multiplying the $i_{\Sigma A}(t)$ by a constant greater than 1. The $i_{set2L}$ may be set to sense a high resistance fault at an end of the first DC transmission line. That is, a high resistance fault may be generated at the end of the first DC transmission line, in which case the direction action amount $i_{\Sigma A}(t)$ of the first DC transmission line may be computed, and the $i_{set2L}$ may be acquired by dividing the $i_{\Sigma A}(t)$ by a constant greater than 1.

In S105, it may be determined, within a time period $t_0 \sim t_{limit}$, whether the current difference $di_M'(j)$ of the M side of the second DC transmission line and the current difference $di_M(j)$ of the M side of the first DC transmission line at the time point j meet a first pole amplitude-comparison change current pole selecting criterion and a second pole amplitude-comparison change current pole selecting criterion preset. It may be determined, within a time period $t_0 \sim t_f$, whether the current difference $di_M(j)$ of the M side of the first DC transmission line at the time point j meets the first pole amplitude-comparison change current pole selecting criterion preset. It may be determined, after the time point $t_f$, whether the direction action amount $i_{\Sigma A}(t)$ of the first DC transmission line meets a ratio braked current pole selecting criterion. When both the first pole amplitude-comparison change current pole selecting criterion and the second pole amplitude-comparison change current pole selecting criterion continue to be not met within the time period $t_0 \sim t_{limit}$, or the first pole amplitude-comparison change current pole selecting criterion is met at one time point within the time period $t_0 \sim t_f$, or the ratio braked current pole selecting criterion is met at a time point after the time point $t_f$, a stage-wise current pole selecting criterion is met. The first pole is the M side of the first DC transmission line. The second pole is the M side of the second DC transmission line. $t_0 \leq j \leq k$. $t_0 \leq k \leq t$. $t_f > t_{limit}$.

It may be determined, within the time period $t_0 \sim t_{limit}$, whether the current difference $di_M(j)$ of the M side of the second DC transmission line and the current difference $di_M(j)$ of the M side of the first DC transmission line at the time point j meet the first pole amplitude-comparison change current pole selecting criterion and the second pole amplitude-comparison change current pole selecting criterion preset; it may be determined, within the time period $t_0 \sim t_f$, whether the current difference $di_M(j)$ of the M side of the first DC transmission line at the time point j meets the first pole amplitude-comparison change current pole selecting criterion preset; and it may be determined, after the time point $t_f$, whether the direction action amount $i_{\Sigma A}(t)$ of the first DC transmission line meets the ratio braked current pole selecting criterion, as follows.

It may be determined, within the time period $t_0 \sim t_{limit}$, unit whether the current difference $di_M(j)$ of the M side of the second DC transmission line and the current difference $di_M(j)$ of the M side of the first DC transmission line at the time point j meet the first pole amplitude-comparison change current pole selecting criterion and the second pole amplitude-comparison change current pole selecting criterion preset. The first pole amplitude-comparison change current pole selecting criterion may be as follows.

$$\left|\sum_{k=t_0}^{t}\sum_{k=t_0}^{k} di_M(j)\right| > \sigma \cdot \left|\sum_{k=t_0}^{t}\sum_{k=t_0}^{k} di_M'(j)\right|.$$

The second pole amplitude-comparison change current pole selecting criterion may be as follows.

$$\left|\sum_{k=t_0}^{t}\sum_{j=t_0}^{k}di'_M(j)\right| > \sigma \cdot \left|\sum_{k=t_0}^{t}\sum_{j=t_0}^{k}di_M(j)\right|.$$

The stage-wise current pole selecting criterion is met when the first pole amplitude-comparison change current pole selecting criterion is met at any time point within the time period $t_0 \sim t_f$. When both the first pole amplitude-comparison change current pole selecting criterion and the second pole amplitude-comparison change current pole selecting criterion continue to be not met in the time period $t_0 \sim t_{limit}$, it may be determined that a bipolar fault occurs at the time point $t_{limit}$ and within the time period $t_{limit} \sim t_f$, and the stage-wise current pole selecting criterion is met.

It may be determined, after the time point $t_f$, whether the direction action amount $i_{\Sigma\Delta}(t)$ of the first DC transmission line meets the ratio braked current pole selecting criterion. The ratio braked current pole selecting criterion may be as follows.

$$i_{\Sigma\Delta}(t) > \alpha i_{D\Delta}(t).$$

$$i_{D\Delta}(t) = \frac{1}{n}\left|\sum_{k=t_0}^{t}(\Delta i_M(k) - \Delta i_N(k - T_{tran}))\right|.$$

The $\sigma$ may be a pole selecting coefficient. $\sigma > 1$. The $\alpha$ may be a ratio braking coefficient. $\alpha > 1$. The $\alpha i_{D\Delta}(t)$ may be a directional braking quantity. After the time point $t_f$, the result of the ratio braked current pole selecting criterion may be taken as the result of the stage-wise current pole selecting criterion, and the stage-wise current pole selecting criterion is met when the ratio braked current pole selecting criterion is met.

Figure 4:
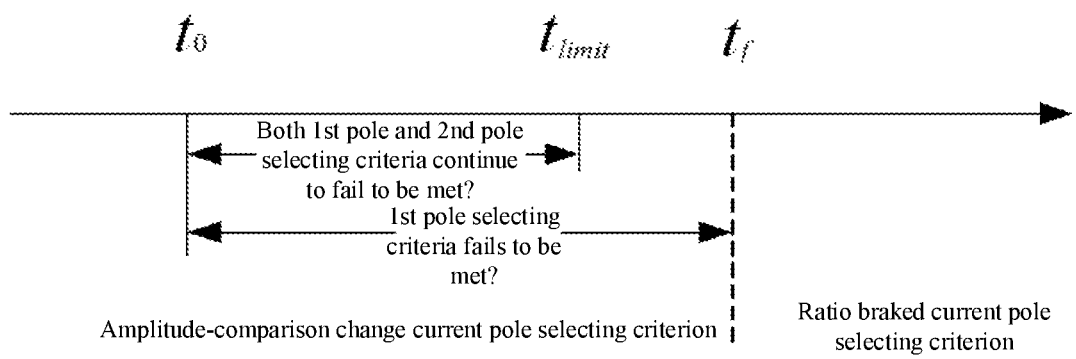
FIG. 4 is a diagram of timing of a stage-wise current pole selecting criterion of a first DC transmission line according to an implementation of the present disclosure.

FIG. 4 is a diagram of timing of a stage-wise current pole selecting criterion of a first DC transmission line according to an implementation of the present disclosure. As shown in FIG. 4, the time point of starting protection at the M side of the first DC transmission line may be denoted as $t_0$. The stage-wise current pole selecting criterion is met when the first pole amplitude-comparison change current pole selecting criterion is met at any time point within the time period $t_0 \sim t_f$. When both the first pole amplitude-comparison change current pole selecting criterion and the second pole amplitude-comparison change current pole selecting criterion continue to be not met within the time period $t_0 \sim t_{limit}$, it is determined that a bipolar fault occurs at the time point $t_{limit}$ and within the time period $t_{limit} \sim t_f$, and that the stage-wise current pole selecting criterion is met. After the time point $t_f$, the result of the ratio braked current pole selecting criterion may be taken as the result of the stage-wise current pole selecting criterion, and the stage-wise current pole selecting criterion is met when the ratio braked current pole selecting criterion is met.

In S106, a difference quantity $i_\Delta(k)$ of the M side of the first DC transmission line at the time point k may be computed according to the current change $\Delta i_N(k-T_{tran})$ of the N side of the first DC transmission line and the current difference $di_M(k)$ of the M side of the first DC transmission line at the time point k. A reverse difference quantity $i_\Delta'(k)$ of the M side of the first DC transmission line at the time point k is determined based on the difference quantity $i_\Delta(k)$.

It is determined whether the reverse difference quantity $i_\Delta'(k)$ of the M side of the first DC transmission line at the time point k meets a difference accumulation large number preventing protection criterion preset.

The difference quantity $i_\Delta(k)$ of the M side of the first DC transmission line at the time point k may be computed according to the current change $\Delta i_N(k-T_{tran})$ of the N side of the first DC transmission line and the current difference $di_M(k)$ of the M side of the first DC transmission line at the time point k; the reverse difference quantity $i_\Delta'(k)$ of the M side of the first DC transmission line at the time point k may be determined based on the difference quantity $i_\Delta(k)$; and it may be determined whether the reverse difference quantity $i_\Delta'(k)$ of the M side of the first DC transmission line at the time point k meets the difference accumulation large number preventing protection criterion preset, as follows.

The difference quantity $i_\Delta(k)$ of the M side of the first DC transmission line at the time point k may be computed according to the current change $\Delta i_N(k-T_{tran})$ of the N side of the first DC transmission line and the current difference $di_M(k)$ of the M side of the first DC transmission line at the time point k, as follows.

$$i_\Delta(k) = |di_M(k)| + \Delta i_N(k - T_{tran}).$$

The reverse difference quantity $i_\Delta'(k)$ of the M side of the first DC transmission line at the time point k may be determined based on the difference quantity $i_\Delta(k)$, as follows.

$$i'_\Delta(k) = f(i_\Delta(k)).$$

The f may be a reverse method, where the reverse difference quantity of the time point k is set as a product of $i_\Delta(k)$ of a maximal absolute value within the time period $t_0 \sim t$ and $-v$, and the reverse difference quantity of another time point is set as $i_\Delta(k)$ of the another time point. $v > 1$.

It may be determined whether the reverse difference quantity $i_\Delta'(k)$ of the M side of the first DC transmission line at the time point k meets the difference accumulation large number preventing protection criterion preset. The difference accumulation large number preventing protection criterion may be as follows.

$$i_f(t) > i_{set3}.$$

$$i_f(t) = \frac{1}{n}\sum_{k=t_0}^{t}i'_\Delta(k).$$

The $i_f(t)$ may be a large number preventing difference action amount. The $i_{set3}$ may be a large number preventing differential value, and may be set to sense a high resistance fault at an end of the first DC transmission line. That is, in case a high resistance fault is generated at the end of the first DC transmission line, the large number preventing difference action amount $i_f(t)$ of the first DC transmission line may be computed, and the $i_{set3}$ may be acquired by dividing the $i_f(t)$ by a constant greater than 1.

In S107, a large number preventing change $i_z(k)$ of the first DC transmission line at the time point k may be computed according to the current change $\Delta i_N(k-T_{tran})$ of the N side and the current change $\Delta i_M(k)$ of the M side of the first DC transmission line. It may be determined whether the large number preventing change $i_z(k)$ of the first DC transmission line at the time point k meets a current change large number preventing protection criterion.

The large number preventing change $i_z(k)$ of the first DC transmission line at the time point k may be computed according to the current change $\Delta i_N(k-T_{tran})$ of the N side and the current change $\Delta i_M(k)$ of the M side of the first DC transmission line, and it may be determined whether the large number preventing change $i_z(k)$ of the first DC transmission line at the time point k meets the current change large number preventing protection criterion, as follows.

The large number preventing change $i_z(k)$ of the first DC transmission line at the time point k may be computed according to the current change $\Delta i_N(k-T_{tran})$ of the N side and the current change $\Delta i_M(k)$ of the M side of the first DC transmission line, as follows.

$$i_Z(k)=\Delta i_M(k)+\Delta i_N(k-T_{tran})$$

It may be determined whether the large number preventing change $i_z(k)$ of the first DC transmission line at the time point k meets the current change large number preventing protection criterion. The current change large number preventing protection criterion may be as follows.

$$|i_Z(k)|>i_{set4}.$$

The $i_{set4}$ may be a large number preventing change value, and may be set to sense a high resistance fault at an end of the first DC transmission line. That is, in case a high resistance fault is generated at the end of the first DC transmission line, the large number preventing change $i_z(k)$ of the first DC transmission line k may be computed, and the $i_{set4}$ may be acquired by dividing the $|i_z(k)|$ by a constant greater than 1.

In S108, when the difference accumulation large number preventing protection criterion, the accumulation high value direction criterion of the opposite-end boosted change current, and the opposite-end boosted differential current accumulation criterion of the first DC transmission line are met simultaneously at the time point t, and within a time period $t_0$~t a number of sampling points meeting the current change large number preventing protection criterion is greater than both a preset point number threshold and a number of sampling points not meeting the current change large number preventing protection criterion, or when the difference accumulation large number preventing protection criterion, the stage-wise current pole selecting criterion, the accumulation low value direction criterion of the opposite-end boosted change current, and the opposite-end boosted differential current accumulation criterion of the first DC transmission line are met simultaneously at the time point t, and within the time period $t_0$~t the number of sampling points meeting the current change large number preventing protection criterion is greater than both the preset point number threshold and the number of sampling points not meeting the current change large number preventing protection criterion, a protection action on the M side of the first DC transmission line is exported.

Figure 5:
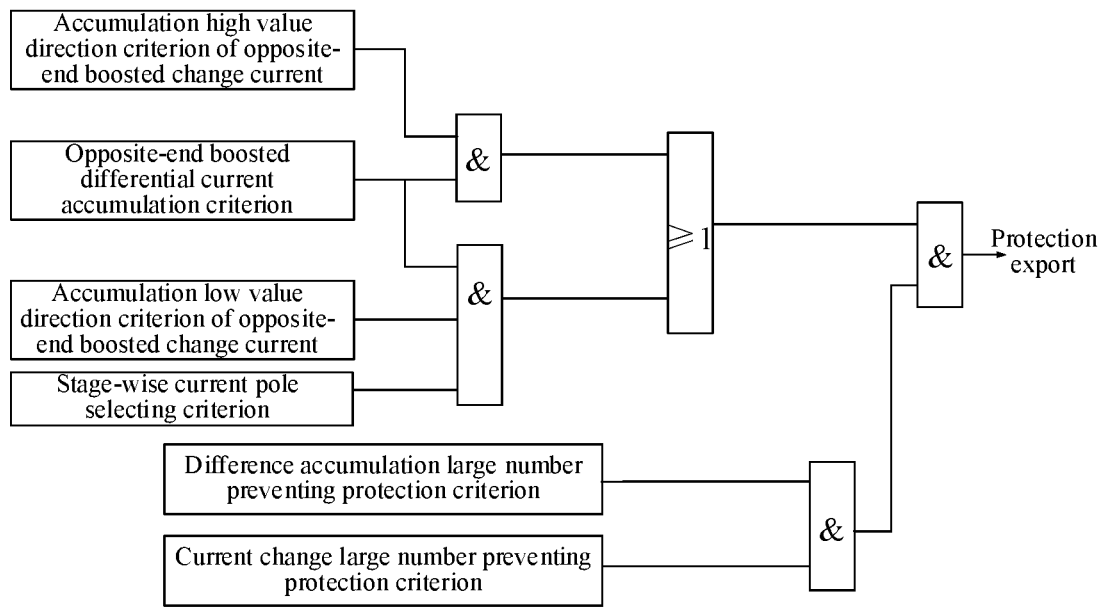
FIG. 5 is a diagram of a logic for protecting a DC transmission line based on pure current characteristics according to an implementation of the present disclosure.

FIG. 5 is a diagram of a logic for protecting a DC transmission line based on pure current characteristics according to an implementation of the present disclosure. As shown in FIG. 5, the logic for protecting a DC transmission line based on pure current characteristics according to the implementation may be as follows. The accumulation high value direction criterion of the opposite-end boosted change current and the opposite-end boosted differential current accumulation criterion may be input to an "AND" gate logic. The accumulation low value direction criterion of the opposite-end boosted change current, the opposite-end boosted differential current accumulation protection criterion, and the stage-wise current pole selecting method may be input to an "AND" gate logic. The two "AND" gate logic results may be input to an "OR" gate logic. The difference accumulation large number preventing protection criterion and the current change large number preventing protection criterion may be input to an "AND" gate logic, which, together with the "OR" gate logic, may then pass through an "AND" gate logic before being exported.

In the implementation, consider when a high resistance fault of 800 ohm occurs at an end F3 of the first DC transmission line as shown in FIG. 2.

Figure 6A:
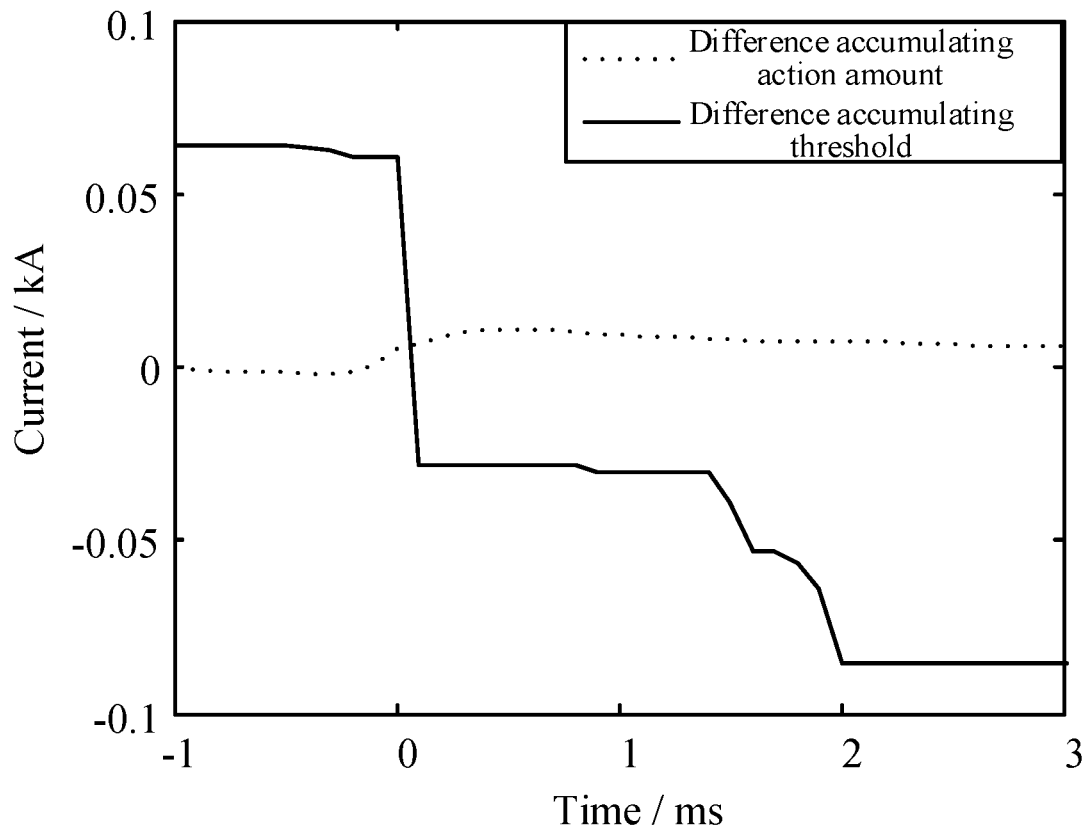
FIG. 6A is a diagram of waveforms of a difference accumulating threshold and a difference accumulating action amount over time in case of a high resistance fault at an end of a first DC transmission line according to an implementation of the present disclosure.

FIG. 6A is a diagram of waveforms of a difference accumulating threshold and a difference accumulating action amount over time in case of a high resistance fault at an end of a first DC transmission line according to an implementation of the present disclosure. As shown in FIG. 6A, the dotted line shows the waveform of the difference accumulating action amount over time, and the solid line shows the waveform of the difference accumulating threshold over time. It is seen from the waveforms that the difference accumulating action amount is greater than the difference accumulating threshold 0 ms after the protection at the M side of the first DC transmission line has been started, and the opposite-end boosted differential current accumulation criterion is met.

Figure 6B:
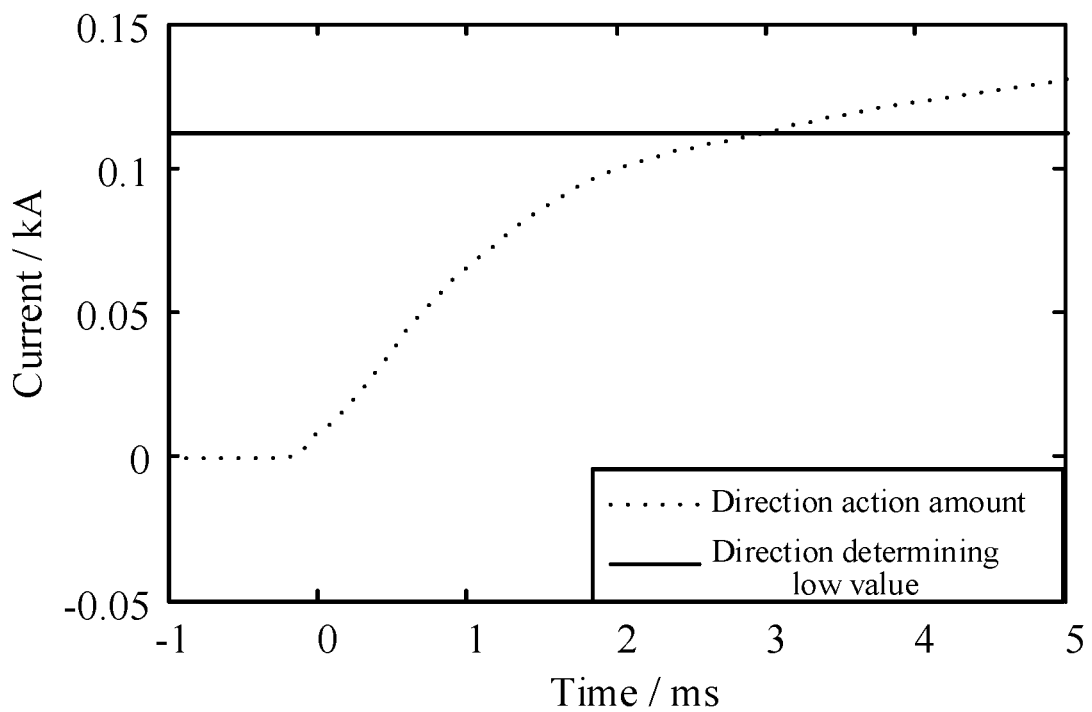
FIG. 6B is a diagram of waveforms of a direction determining low value and a direction action amount over time in case of a high resistance fault at an end of a first DC transmission line according to an implementation of the present disclosure.

FIG. 6B is a diagram of waveforms of a direction determining low value and a direction action amount over time in case of a high resistance fault at an end of a first DC transmission line according to an implementation of the present disclosure. As shown in FIG. 6B, the dotted line is the waveform of the direction action amount over time, and the solid line is the waveform of the direction determining low value over time. As the direction determining low value is acquired by setting sensitivity to sense a high resistance fault at an end of the DC transmission line, the direction determining low value is a constant. Therefore, the waveform over time is a horizontal line. It is seen from the waveforms that the direction action amount is greater than the direction determining low value 3 ms after the protection at the M side of the first DC transmission line has been started, and the accumulation low value direction criterion of the opposite-end boosted change current is met.

Figure 6C:
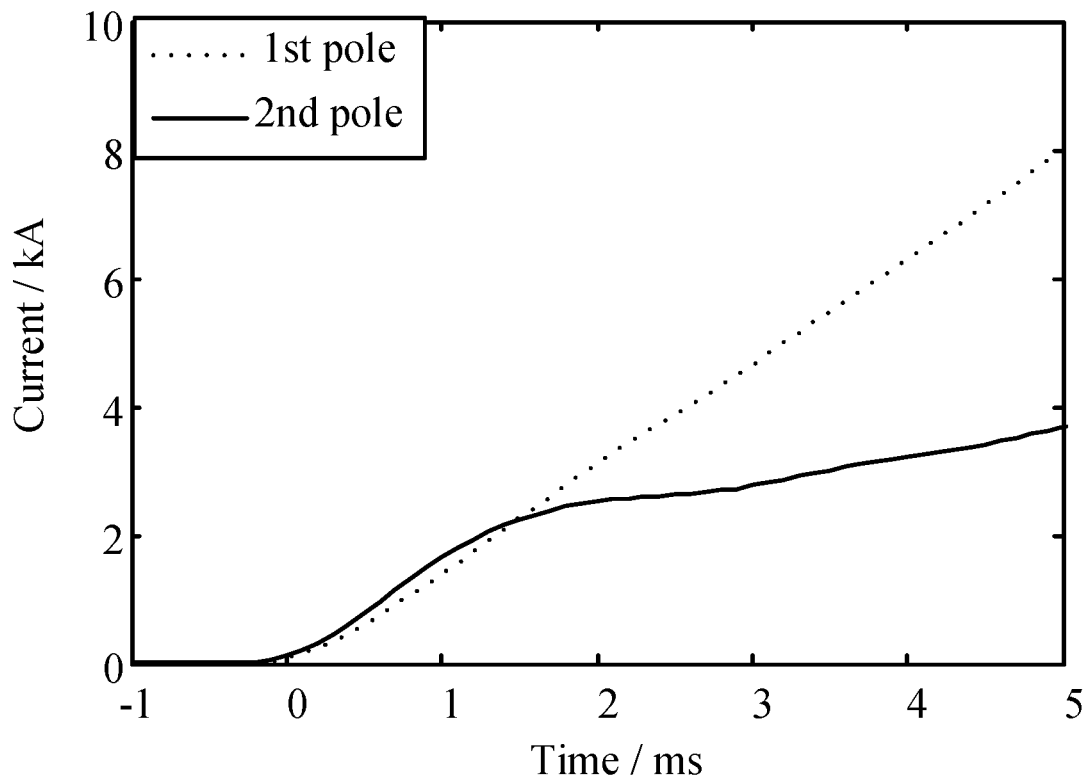
FIG. 6C is a diagram of waveforms of an amplitude-comparison change current amplitude of a first pole and an amplitude-comparison change current amplitude of a second pole over time in case of a high resistance fault at an end of a first DC transmission line according to an implementation of the present disclosure.

FIG. 6C is a diagram of waveforms of an amplitude-comparison change current amplitude of a first pole and an amplitude-comparison change current amplitude of a second pole over time in case of a high resistance fault at an end of a first DC transmission line according to an implementation of the present disclosure. As shown in FIG. 6C, the dotted line is the waveform of the amplitude-comparison change current amplitude of the first pole over time, and the solid line is the waveform of the amplitude-comparison change current amplitude of the second pole over time. It is seen from the waveforms that the amplitude-comparison change current amplitude of the first pole is greater than the amplitude-comparison change current amplitude of the second pole 1.6 ms after the protection at the M side of the first DC transmission line has been started, the first pole amplitude-comparison change current pole selecting criterion is met, and therefore the stage-wise current pole selecting criterion is met.

Figure 6D:
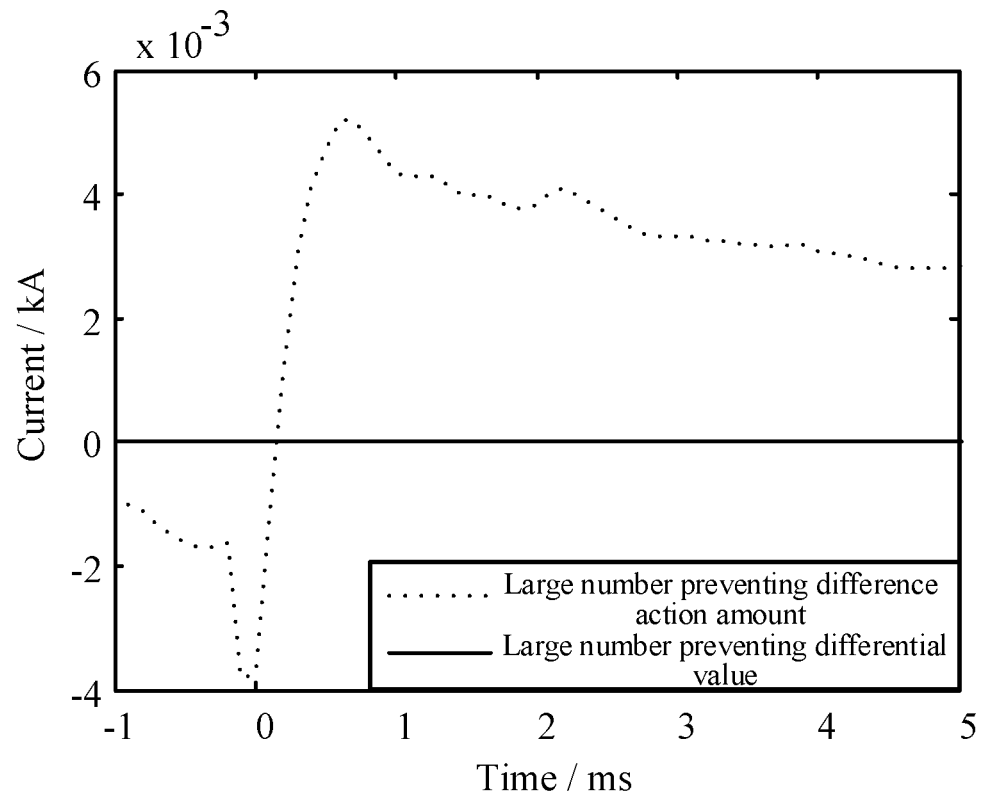
FIG. 6D is a diagram of waveforms of a large number preventing difference action amount and a large number preventing differential value over time in case of a high resistance fault at an end of a first DC transmission line according to an implementation of the present disclosure.

FIG. 6D is a diagram of waveforms of a large number preventing difference action amount and a large number preventing differential value over time in case of a high resistance fault at an end of a first DC transmission line according to an implementation of the present disclosure. As shown in FIG. 6D, the dotted line is the waveform of the large number preventing difference action amount over time, and the solid line is the waveform of the large number preventing differential value over time. As the large number preventing differential value is acquired by setting sensitivity to sense a high resistance fault at an end of the DC transmission line, the large number preventing differential value is a constant, and therefore the waveform over time is a horizontal line. It is seen from the waveforms that the large number preventing difference action amount is greater than the large number preventing differential value 0.2 ms after the protection at the M side of the first DC transmission line has been started, and the difference accumulation large number preventing protection criterion is met.

Figure 6E:
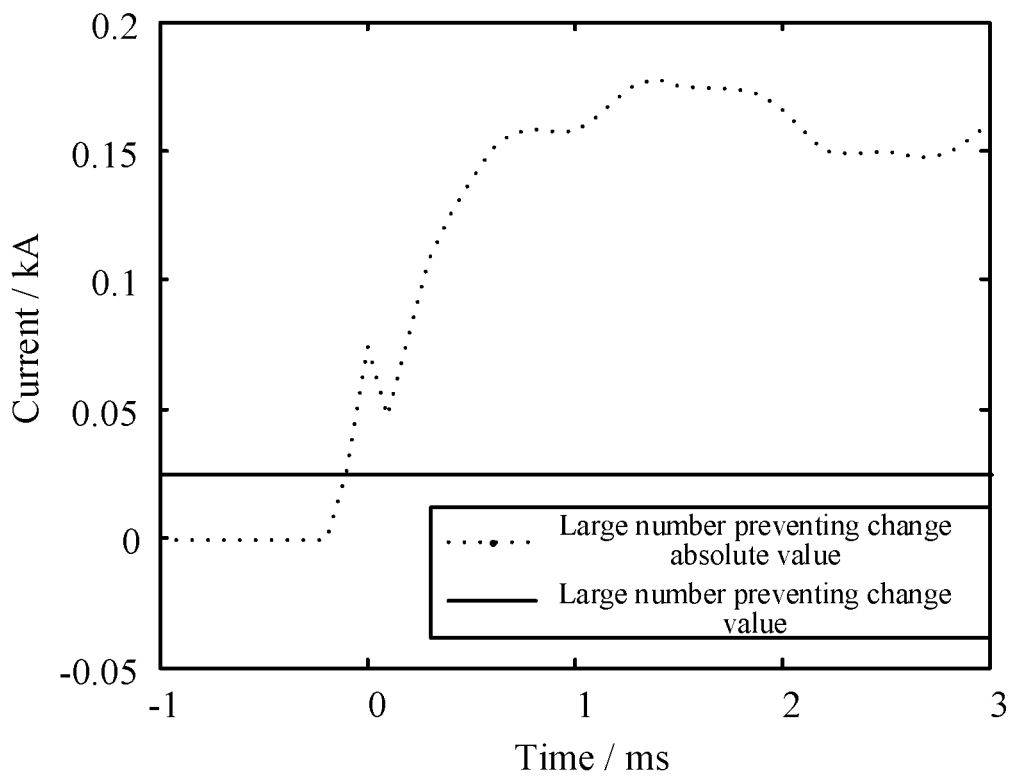
FIG. 6E is a diagram of waveforms of a large number preventing change absolute value and a large number preventing change value over time in case of a high resistance fault at an end of a first DC transmission line according to an implementation of the present disclosure.

FIG. 6E is a diagram of waveforms of a large number preventing change absolute value and a large number preventing change value over time in case of a high resistance fault at an end of a first DC transmission line according to an implementation of the present disclosure. As shown in FIG. 6E, the dotted line is the waveform of the large number preventing change absolute value over time, and the solid line is the waveform of the large number preventing change value over time. As the large number preventing change value is acquired by setting sensitivity to sense a high resistance fault at an end of the DC transmission line, the large number preventing change value is a constant, and therefore the waveform over time is a horizontal line. It is seen from the waveforms that the large number preventing change absolute value is greater than the large number preventing change value 0 ms after the protection at the M side of the first DC transmission line has been started, and the current change large number preventing protection criterion is met.

Figure 6F:
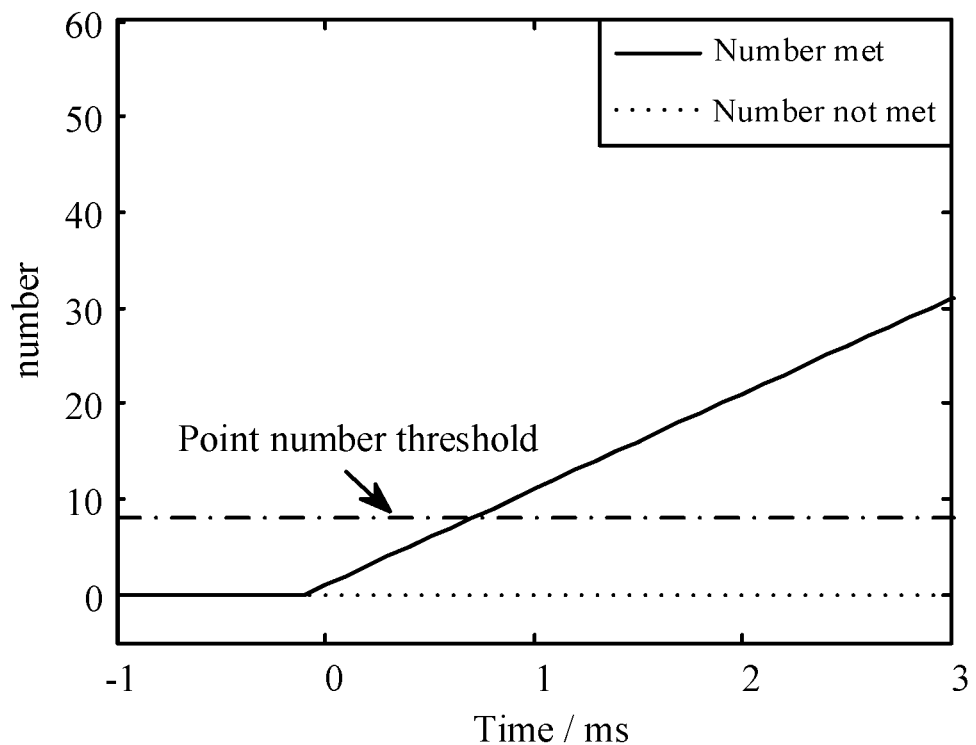
FIG. 6F is a diagram of waveforms of a number of points meeting a number of sampling points meeting a current change large number preventing protection criterion and a number of sampling points not meeting the current change large number preventing protection criterion over time in case of a high resistance fault at an end of a first DC transmission line according to an implementation of the present disclosure.

FIG. 6F is a diagram of waveforms of a number of points meeting a number of sampling points meeting a current change large number preventing protection criterion and a number of sampling points not meeting the current change large number preventing protection criterion over time in case of a high resistance fault at an end of a first DC transmission line according to an implementation of the present disclosure. As shown in FIG. 6F, the solid line is the waveform of the number of points meeting the current change large number preventing protection criterion over time, the dotted line is the waveform of the number of points not meeting the current change large number preventing protection criterion over time, and the dot dash line is a constant m. The m is a preset point number threshold for the current change large number preventing protection criterion, and its waveform over time is a horizontal line. It is seen from the waveforms that after the protection at the M side of the first DC transmission line has been started for 0.7 ms, the number of points meeting the current change large number preventing protection criterion is greater than the constant m and greater than the number of points not meeting the current change large number preventing protection criterion, and the current change large number preventing protection criterion is met.

According to the logic for protecting a DC transmission line based on pure current characteristics shown in FIG. 5, the accumulation low value direction criterion of the opposite-end boosted change current, the opposite-end boosted differential current accumulation protection criterion, and the stage-wise current pole selecting method pass through an "AND" gate logic; the difference accumulation large number preventing protection criterion and the current change large number preventing protection criterion pass through an "AND" gate logic; and then the two sets of criteria pass through an "AND" gate; the protection of the first DC transmission line is exported. Therefore, in the embodiment, all the above criteria are met 3 ms after the protection at the M side of the first DC transmission line has been started, and the DC protection at the M side of the first DC transmission line may be exported.

In the implementation, consider when a bipolar metallic fault occurs at the end F3 of the first DC transmission line as shown in FIG. 2.

Figure 7A:
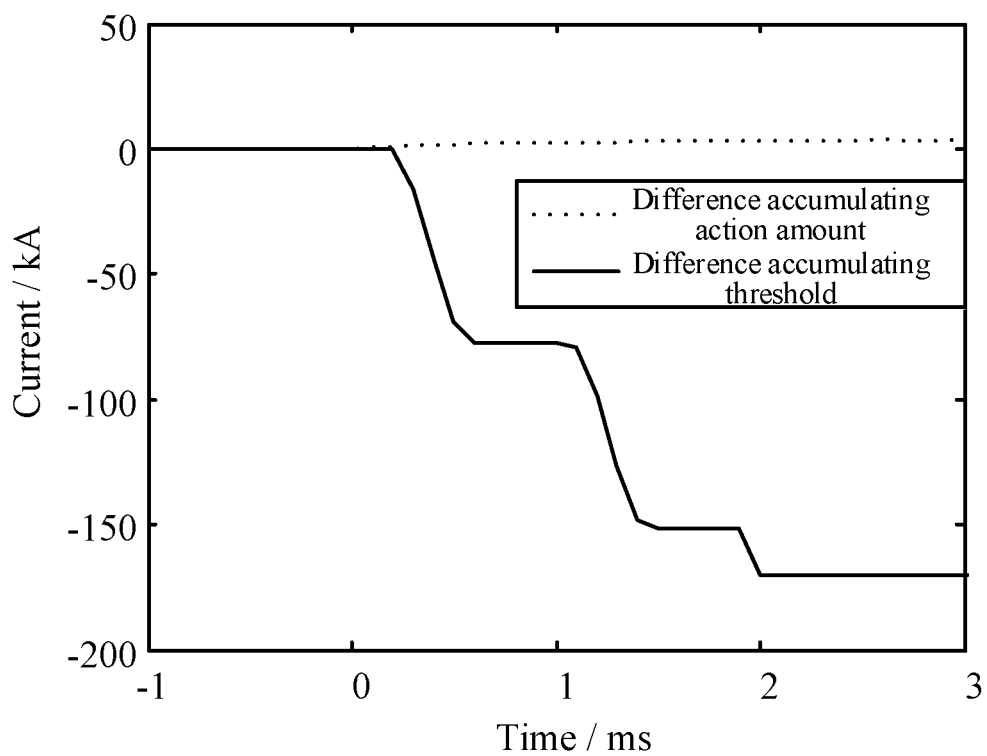
FIG. 7A is a diagram of waveforms of a difference accumulating threshold and a difference accumulating action amount over time in case of a bipolar metallic fault at an end of a first DC transmission line according to an implementation of the present disclosure.

FIG. 7A is a diagram of waveforms of a difference accumulating threshold and a difference accumulating action amount over time in case of a bipolar fault at an end of a first DC transmission line according to an implementation of the present disclosure. As shown in FIG. 7A, the dotted line is the waveform of the difference accumulating action amount over time, and the solid line is the waveform of the difference accumulating threshold over time. It is seen from the waveforms that the difference accumulating action amount is greater than the difference accumulating threshold 0 ms after the protection at the M side of the first DC transmission line has been started, and the opposite-end boosted differential current accumulation criterion is met.

Figure 7B:
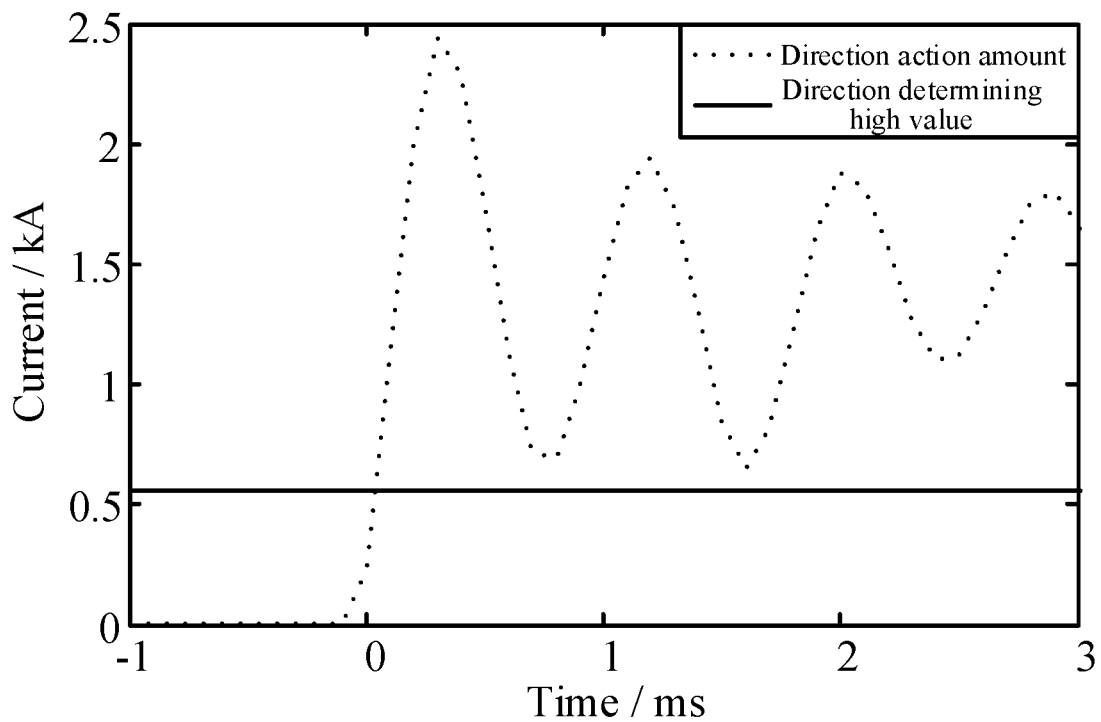
FIG. 7B is a diagram of waveforms of a direction determining high value and a direction action amount over time in case of a bipolar metallic fault at an end of a first DC transmission line according to an implementation of the present disclosure.

FIG. 7B is a diagram of waveforms of a direction determining high value and a direction action amount over time in case of a bipolar fault at an end of a first DC transmission line according to an implementation of the present disclosure. As shown in FIG. 7B, the dotted line is the waveform of the direction action amount over time, and the solid line is the waveform of the direction determining high value over time. As the direction determining high value is acquired by being set to sense a metallic fault at an end of a second DC transmission line, the direction determining high value is a constant, and therefore the waveform over time is a horizontal line. It is seen from the waveforms that the direction action amount is greater than the direction determining high value 0 ms after the protection at the M side of the first DC transmission line has been started, and the accumulation high value direction criterion of the opposite-end boosted change current is met.

Due to the fact that in the implementation, the large number preventing difference action amount is greater than the large number preventing differential value 0.2 ms after start, the difference accumulation large number preventing protection criterion is met. 0.7 ms after start, when the number of points meeting the current change large number preventing protection criterion is greater than the constant m and greater than the number of points not meeting the current change large number preventing protection criterion, according to the logic for protecting a DC transmission line based on pure current characteristics as shown in FIG. 5, the accumulation high value direction criterion of the opposite-end boosted change current and the opposite-end boosted differential current accumulation criterion pass through an "AND" gate logic, the difference accumulation large number preventing protection criterion and the current change large number preventing protection criterion pass through an "AND" gate logic; the two sets of criteria pass through an "AND" gate; then the protection of the first DC transmission line is exported. Therefore, in the embodiment, all the above criteria are met 0.7 ms after the protection at the M side of the first DC transmission line has been started, and the DC protection at the M side of the first DC transmission line may be exported.

In the implementation, consider when a metallic fault occurs at an end of the second DC transmission line as shown in FIG. 2.

The difference accumulating action amount is greater than the difference accumulating threshold 0 ms after the protection at the M side of the first DC transmission line has been started, and the opposite-end boosted differential current accumulation criterion is met.

Figure 8A:
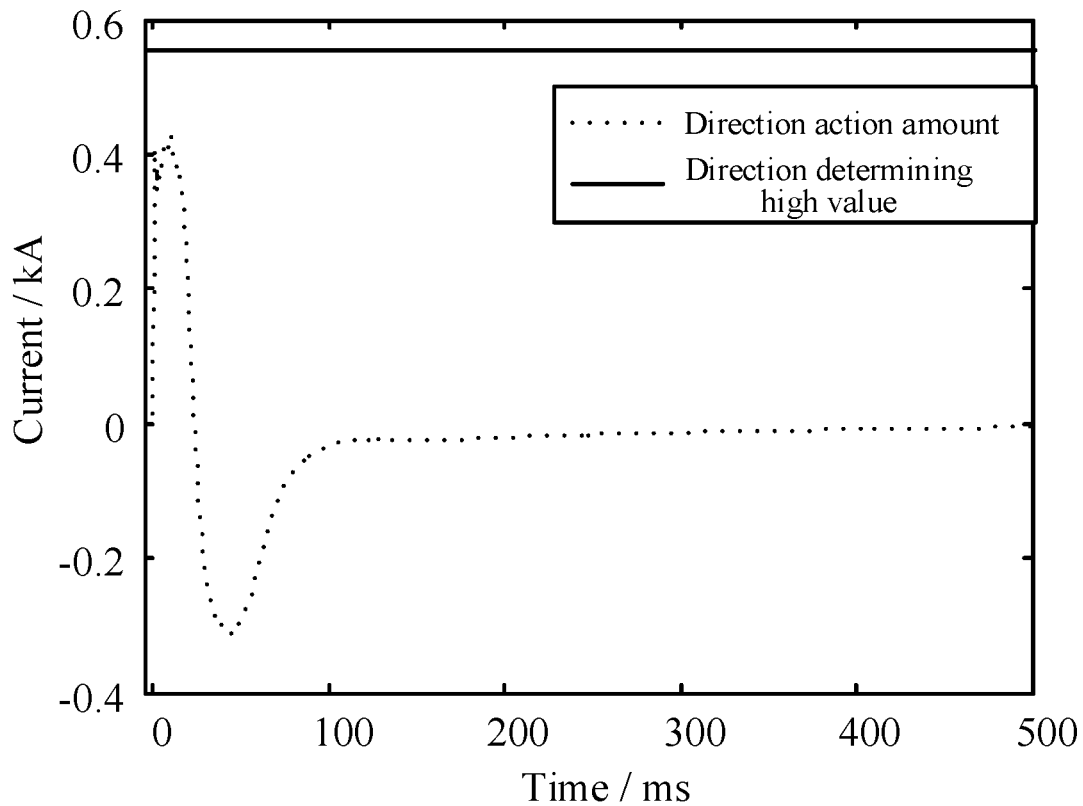
FIG. 8A is a diagram of waveforms of a direction determining high value and a direction action amount over time in case of a metallic fault at an end of a second DC transmission line according to an implementation of the present disclosure.

FIG. 8A is a diagram of waveforms of a direction determining high value and a direction action amount over time in case of a metallic fault at an end of a second DC transmission line according to an implementation of the present disclosure. As shown in FIG. 8A, the dotted line is the waveform of the direction action amount over time, and the solid line is the waveform of the direction determining high value over time, which is a constant, and therefore the waveform over time is a horizontal line. It is seen from the waveforms that 500 ms after the protection at the M side of the first DC transmission line has been started, the direction action amount is always less than the direction determining high value, and an accumulation high value direction criterion of a direction determining opposite-end boosted change current is not met.

Figure 8B:
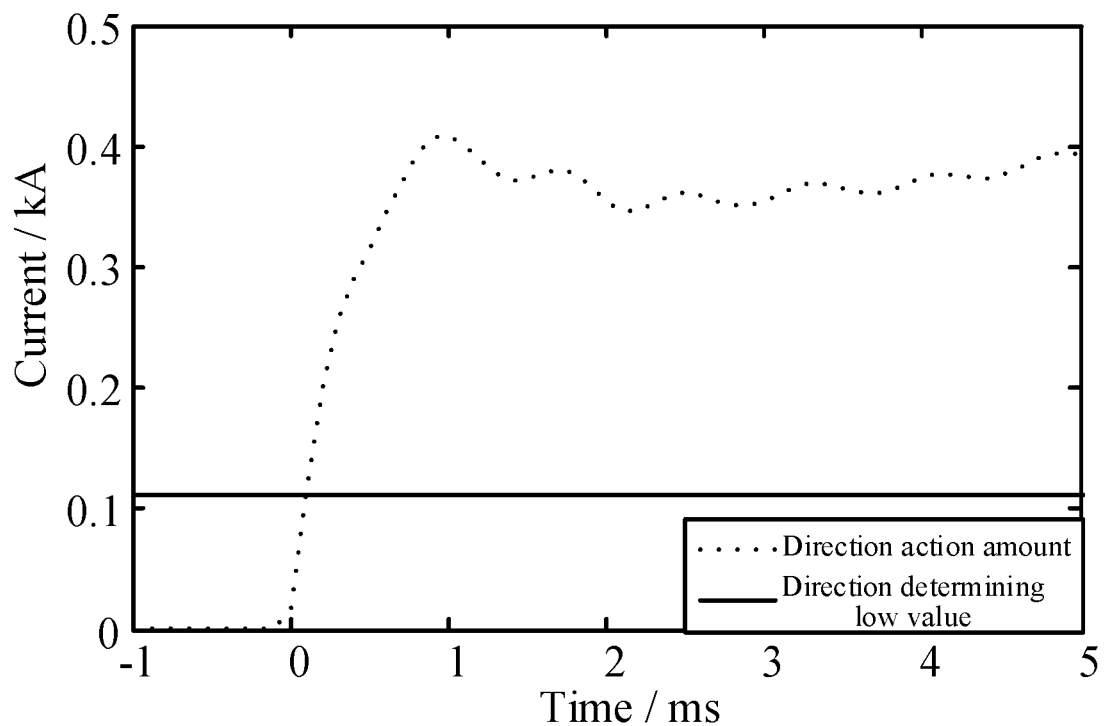
FIG. 8B is a diagram of waveforms of a direction determining low value and a direction action amount over time in case of a metallic fault at an end of a second DC transmission line according to an implementation of the present disclosure.

FIG. 8B is a diagram of waveforms of a direction determining low value and a direction action amount over time in case of a metallic fault at an end of a second DC transmission line according to an implementation of the present disclosure. As shown in FIG. 8B, the dotted line is the waveform of the direction action amount over time, and the solid line is the waveform of the direction determining low value over time, which is a constant, and therefore the waveform over time is a horizontal line. It is seen from the waveforms that the direction action amount is greater than the direction determining low value 0.1 ms after the protection at the M side of the first DC transmission line has been started, and the accumulation low value direction criterion of the opposite-end boosted change current is met.

Figure 8C:
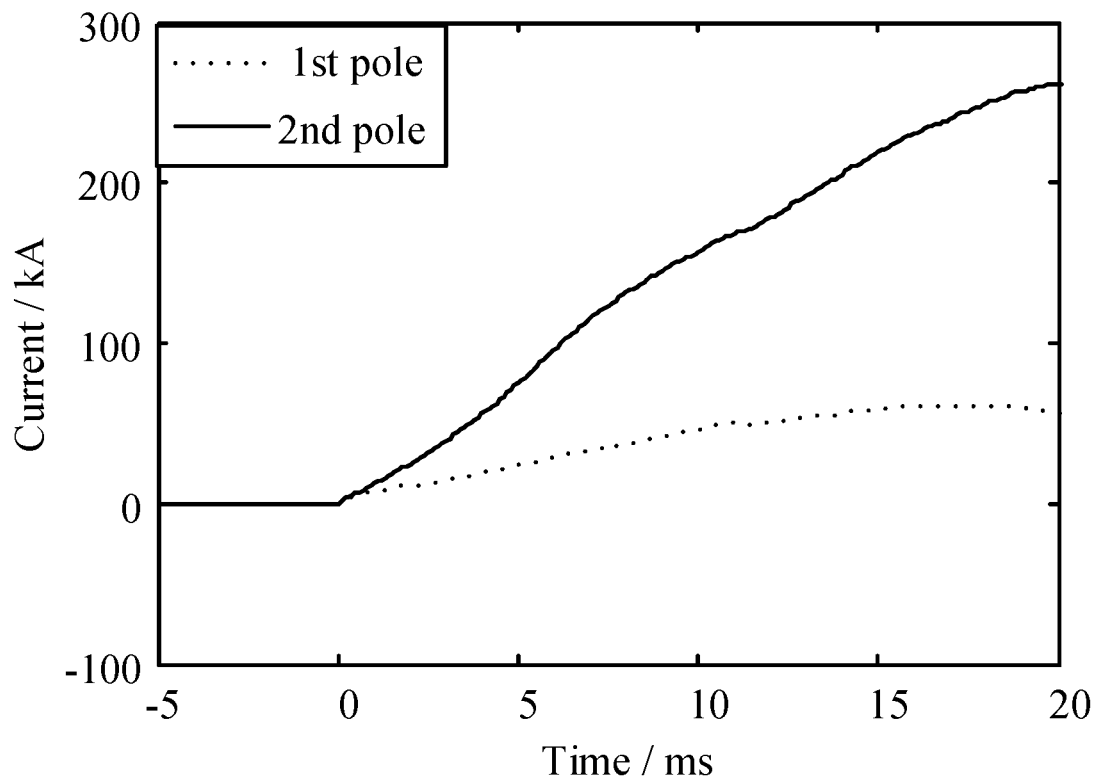
FIG. 8C is a diagram of waveforms of an amplitude-comparison change current amplitude of a first pole and an amplitude-comparison change current amplitude of a second pole over time in case of a metallic fault at an end of a second DC transmission line according to an implementation of the present disclosure.

FIG. 8C is a diagram of waveforms of an amplitude-comparison change current amplitude of a first pole and an amplitude-comparison change current amplitude of a second pole over time in case of a metallic fault at an end of a second DC transmission line according to an implementation of the present disclosure. As shown in FIG. 8C, the dotted line is the waveform of the amplitude-comparison change current amplitude of the first pole over time, and the solid line is the waveform of the amplitude-comparison change current amplitude of the second pole over time. It is seen from the waveforms that the amplitude-comparison change current amplitude of the first pole is less than the amplitude-comparison change current amplitude of the second pole at the M side of the first DC transmission line within the time period $t_0 \sim t_f$, the first pole amplitude-comparison change current pole selecting criterion is not met, the second pole amplitude-comparison change current pole selecting criterion is met, and therefore the stage-wise current pole selecting criterion is not met.

Figure 8D:
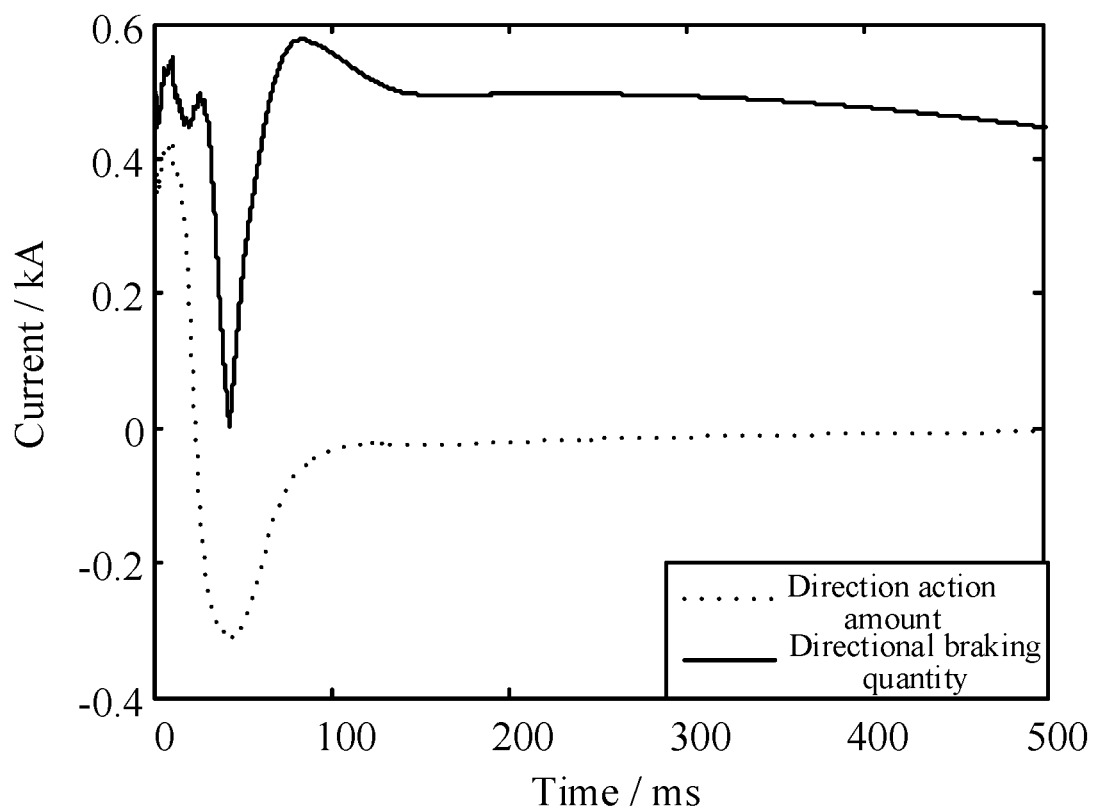
FIG. 8D is a diagram of waveforms of a direction action amount and a directional braking quantity over time in case of a fault at an end of a second DC transmission line according to an implementation of the present disclosure.

FIG. 8D is a diagram of waveforms of a direction action amount and a directional braking quantity over time in case of a fault at an end of a second DC transmission line according to an implementation of the present disclosure. As shown in FIG. 8D, the dotted line is the waveform of the direction action amount over time, and the solid line is the waveform of the directional braking quantity over time. It is seen from the waveforms that the direction action amount is less than the directional braking quantity $t_f$ after start, the ratio braked current pole selecting criterion is not met, and therefore the stage-wise current pole selecting criterion is not met.

According to the logic for protecting a DC transmission line based on pure current characteristics shown in FIG. 5, when the opposite-end boosted differential current accumulation criterion is met and the accumulation high value direction criterion of the opposite-end boosted change current is not met, the "AND" gate logic of the two is not met, or when the "AND" gate logic of the opposite-end boosted differential current accumulation criterion and the accumulation low value direction criterion of the opposite-end boosted change current is met and the stage-wise current pole selecting criterion is not met, the last "AND" gate logic in the logic diagram is not met even if the difference accumulation large number preventing protection criterion and the current change large number preventing protection criterion are met. Therefore, after the protection at the M side of the first DC transmission line has been started, the DC protection thereof is not exported.

In addition to a high resistance fault, a bipolar fault of the first DC transmission line and a metallic fault at an end of the second DC transmission line in the implementation, the method for protecting a DC transmission line based on pure current characteristics may also be applied to that the protection of the DC transmission line be exported reliably or not exported in case of a single-pole metallic fault of the DC transmission line, an out-of-zone fault at an end of the DC line, as well as a lightning strike on the DC line or an abnormal large number during sampling.

In case of single-pole operation of a DC transmission system, the current value of an opposite-end current is set to 0, and the DC protection action may still be exported according to the above DC protection criterion based on pure current characteristics.

Figure 9:
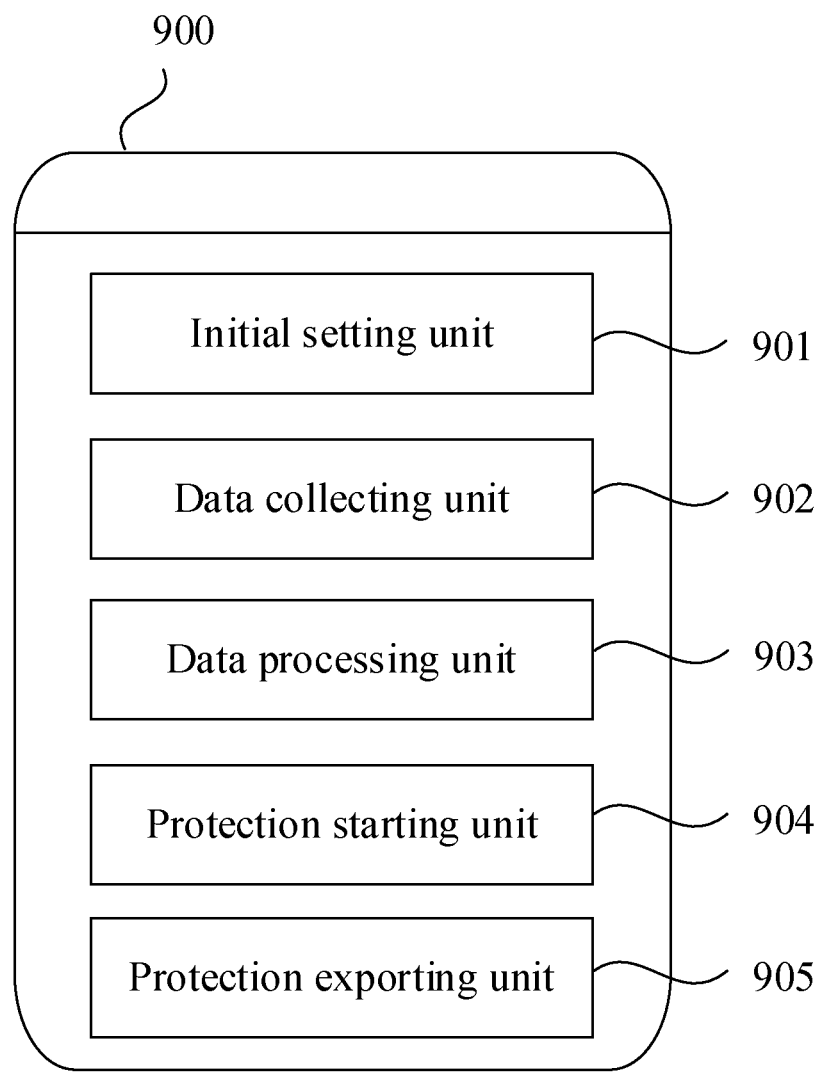
FIG. 9 is a diagram of a structure of a system for protecting a Direct-Current (DC) transmission line based on pure current characteristics according to an implementation of the present disclosure.

FIG. 9 is a diagram of a structure of a system for protecting a Direct-Current (DC) transmission line based on pure current characteristics according to an implementation of the present disclosure. As shown in FIG. 9, the system 900 for protecting a DC transmission line based on pure current characteristics according to the implementation may include an initial setting unit, a data collecting unit, a data processing unit, a protection starting unit, and a protection exporting unit.

The initial setting unit 901 is configured to determine a first DC transmission line, a second DC transmission line, an M side and an N side of the first DC transmission line, and an M side of the second DC transmission line, set a protection starting criterion, an opposite-end boosted differential current accumulation criterion, an accumulation high value direction criterion of an opposite-end boosted change current, an accumulation low value direction criterion of the opposite-end boosted change current, a first pole amplitude-comparison change current pole selecting criterion, a second pole amplitude-comparison change current pole selecting criterion, a ratio braked current pole selecting criterion, a difference accumulation large number preventing protection criterion, and a current change large number preventing protection criterion, and assign values to a sampling point number threshold and an assignable parameter in the criteria. The first DC transmission line is one of transmission lines. The second DC transmission line is a DC transmission line other than the first DC transmission line. The M side of the first DC transmission line is one of an inverter side and a rectifier side of the first DC transmission line. The M side of the second DC transmission line is located on a same side as the M side of the first DC transmission line. The N side of the first DC transmission line is opposite the M side of the first DC transmission line.

The data collecting unit 902 is configured to collect, in real time, line currents of the M side and the N side of the first DC transmission line, as well as a line current of the M side of the second DC transmission line.

The data processing unit 903 is configured to compute a current difference of the M side of the first DC transmission line according to the line current of the M side of the first DC transmission line, compute a current difference of the N side of the first DC transmission line according to the line current of the N side of the first DC transmission line, compute a current difference of the M side of the second DC transmission line according to the line current of the M side of the second DC transmission line, compute a current change of the M side of the first DC transmission line according to the current difference of the M side of the first DC transmission line, compute a current change of the N side of the first DC transmission line according to the current difference of the N side of the first DC transmission line, and determine, according to a computed result, whether the criteria in the initial setting unit are met.

The protection starting unit 904 is configured to start DC protection at the M side of the first DC transmission line in response to that the protection starting criterion is met. The time point of starting protection is denoted as $t_0$.

The protection exporting unit 905 is configured to export a protection action on the M side of the first DC transmission line after start of DC protection at the M side of the first DC transmission line, in response to that the difference accumulation large number preventing protection criterion, the accumulation high value direction criterion of the opposite-end boosted change current, and the opposite-end boosted differential current accumulation criterion of the first DC transmission line are met simultaneously at the time point t, and within a time period $t_0$~t a number of sampling points meeting the current change large number preventing protection criterion is greater than a preset point number threshold and a number of sampling points not meeting the current change large number preventing protection criterion, or in response to that the difference accumulation large number preventing protection criterion, the stage-wise current pole selecting criterion, the accumulation low value direction criterion of the opposite-end boosted change current, and the opposite-end boosted differential current accumulation criterion of the first DC transmission line are met simultaneously at the time point t, and within the time period $t_0$~t the number of sampling points meeting the current change large number preventing protection criterion is greater than the preset point number threshold and the number of sampling points not meeting the current change large number preventing protection criterion. When the first pole amplitude-comparison change current pole selecting criterion and the second pole amplitude-comparison change current pole selecting criterion continue to be not met within the time period $t_0$~$t_{limit}$, or the first pole amplitude-comparison change current pole selecting criterion is met at any time point within the time period $t_0$~$t_f$, or the ratio braked current pole selecting criterion is met after the time point $t_f$, the stage-wise current pole selecting criterion is met. The first pole is the M side of the first DC transmission line. The second pole is the M side of the second DC transmission line. The t is a time point of sampling by the data collecting unit after start of DC protection at the M side of the first DC transmission line. The $t_{limit}$ and the $t_f$ are two time points after the protection has been started. $t_f$>$t_{limit}$.

The data processing unit 903 may compute a current difference of the M side of the first DC transmission line according to the line current of the M side of the first DC transmission line, compute a current difference of the N side of the first DC transmission line according to the line current of the N side of the first DC transmission line, compute a current difference of the M side of the second DC transmission line according to the line current of the M side of the second DC transmission line, compute a current change of the M side of the first DC transmission line according to the current difference of the M side of the first DC transmission line, and compute a current change of the N side of the first DC transmission line according to the current difference of the N side of the first DC transmission line, as follows.

$$di_M(j)=i_M(j)-i_M(j-t_s).$$

The $di_M(j)$ may be the current difference of the M side of the first DC transmission line at the time point j. The $i_M(j)$ may be the line current of the M side of the first DC transmission line at the time point j. The $i_M(j-t_s)$ may be the line current of the M side of the first DC transmission line at a time point $j-t_s$. The $t_s$ may be a sampling interval.

$$di_N(j-T_{tran})=i_N(j-T_{tran})-i_N(j-t_s-T_{tran}).$$

The $di_N(j-T_{tran})$ may be the current difference of the N side of the first DC transmission line at the time point $j-T_{tran}$. The $i_N(j-T_{tran})$ may be the line current of the N side of the first DC transmission line at the time point $j-T_{tran}$. The $i_N(j-t_s-T_{tran})$ may be the line current of the M side of the first DC transmission line at the time point $j-t_s-T_{tran}$. The $t_s$ may be a sampling interval. The $T_{tran}$ may be a DC line transmission channel delay. $t_0 \leq j \leq t$.

$$di_M'(j)=i_M'(j)-i_M'(j-t_s).$$

The $di_M'(j-T_{tran})$ may be the current difference of the M side of the second DC transmission line at the time point j. The $i_M'(j)$ may be the line current of the M side of the second DC transmission line at the time point j. The $i_M'(j-t_s)$ may be the line current of the M side of the second DC transmission line at the time point $j-t_s$. The $t_s$ may be a sampling interval.

$$\Delta i_M(k) = \sum_{j=t_0}^{k} di_M(j).$$

$$\Delta i_N(k - T_{tran}) = \sum_{j=t_0}^{k} di_N(j - T_{tran}).$$

The $\Delta i_M(k)$ may be the current change of the M side of the first DC transmission line at the time point k. The $di_M(j)$ may be the current difference of the M side of the first DC transmission line at the time point j. The $\Delta i_N(k-T_{tran})$ may be the current change of the N side of the first DC transmission line at the time point $k-T_{tran}$. The $di_N(j-T_{tran})$ may be the current difference of the N side of the first DC transmission line at the time point $j-T_{tran}$. $t_0 \leq j \leq k$. $t_0 \leq k \leq t$. The $t_0$ may be the time point of starting protection. The $t_s$ may be a sampling interval. The $T_{tran}$ may be a DC line transmission channel delay.

The protection starting criterion, the opposite-end boosted differential current accumulation criterion, the accumulation high value direction criterion of the opposite-end boosted change current, the accumulation low value direction criterion of the opposite-end boosted change current, the first pole amplitude-comparison change current pole selecting criterion, the second pole amplitude-comparison change current pole selecting criterion, the ratio braked current pole selecting criterion, the difference accumulation large number preventing protection criterion, and the current change large number preventing protection criterion set by the initial setting unit 901 may be as follows.

The protection starting criterion of the first DC transmission line may be as follows.

$$|di_M(k_0)| > i_{set0}.$$

The $|di_M(k_0)|$ may be the absolute value of the current difference $di_M(k_0)$ of the M side of the first DC transmission line at the time point $k_0$. The $i_{set0}$ may be a starting threshold set to sense a high resistance fault at an end of the line. That is, when a high resistance fault is generated at an end of the first DC transmission line, the absolute value $|di_M(k_0)|$ of the current difference $di_M(k_0)$ of the M side of the first DC transmission line may be computed, and the $i_{set0}$ may be acquired by dividing the $|di_M(k_0)|$ by a constant greater than 1.

The opposite-end boosted differential current accumulation criterion of the first DC transmission line is as follows.

$$i_\Sigma(t) > i_{setz}.$$

$$i_\Sigma(t) = \frac{1}{n}\sum_{k=t_0}^{t}(|di_M(k)| + \Delta i_N(k - T_{tran})).$$

$$i_{setz} = k_k(i_{set1} + \gamma).$$

$$\gamma = \rho \sum_{k=t_0}^{t_0+T} di_M^-(k).$$

$$k_k = \lambda \frac{i_{set1}}{i_{set1} + \rho \sum_{k=t_0}^{t_0+T'} di_M^-(k)}.$$

$$\rho = \frac{i_{set1}}{\sqrt{\left(\frac{i_{set1}}{\rho_{max}}\right)^2 + \left(\sum_{k=t_0}^{t_0+T'} di_M^-(k)\right)^2}}.$$

$$\begin{cases} di_M^-(k) = di_M(k) & di_M(k) < 0 \\ di_M^-(k) = 0 & di_M(k) \geq 0 \end{cases}.$$

The $i_\Sigma(t)$ may be the difference accumulating action amount of the first DC transmission line at the time point t. The $i_{setz}$ may be the difference accumulating threshold. Then n may be a number of sampling points in the time period $t_0 \sim t$. The $|di_M(k)|$ may be an absolute value of the current difference $di_M(k)$ of the M side of the first DC transmission line at the time point k. The $k_k$ may be a reliability coefficient. The $i_{set1}$ may be a fixed threshold, and be determined as a maximum value of the difference accumulating action amount within a time period $T_0$ after an out-of-zone metallic fault. The $\gamma$ may be a floating threshold of a negative slope current. The $di_M^-(k)$ may be the negative slope current. The T may be a floating threshold computing window. The $\rho$ may be a floating threshold coefficient. The $\rho_{max}$ may be a proportionality constant. $\rho_{max} > 1$. The T' may be a fixed computing window. T'>T. The $\lambda$ may be a margin factor. $\lambda > 1$.

The accumulation high value direction criterion of the opposite-end boosted change current of the first DC transmission line is as follows.

$$i_{\Sigma\Delta}(t) > i_{set2H}.$$

$$i_{\Sigma\Delta}(t) = \frac{1}{n}\sum_{k=t_0}^{t}(\Delta i_M(k) + \Delta i_N(k - T_{tran})).$$

The $i_{\Sigma\Delta}(t)$ may be the direction action amount of the first DC transmission line at the time point t. The $i_{set2H}$ may be the accumulation high value for the direction determining opposite-end boosted change current. The $i_{set2H}$ may be set according to a metallic fault at an end of the second DC transmission line. That is, when a metallic fault is generated at the end of the second DC transmission line, the direction action amount $i_{\Sigma\Delta}(t)$ of the first DC transmission line may be computed, and the $i_{set2H}$ may be acquired by multiplying the $i_{\Sigma\Delta}(t)$ by a constant greater than 1. The $\Delta i_M(k)$ may be the current change of the M side of the first DC transmission line at the time point k. The $\Delta i_N(k - T_{tran})$ may be the current change of the N side of the first DC transmission line at the time point k. Then n may be the number of sampling points in the time period $t_0 \sim t$.

The accumulation low value direction criterion of the opposite-end boosted change current of the first DC transmission line is as follows.

$$i_{\Sigma\Delta}(t) > i_{set2L}.$$

$$i_{\Sigma\Delta}(t) = \frac{1}{n}\sum_{k=t_0}^{t}(\Delta i_M(k) + \Delta i_N(k - T_{tran})).$$

The $i_{\Sigma\Delta}(t)$ may be the direction action amount of the first DC transmission line at the time point t. The $i_{set2L}$ may be the accumulation low value for a direction determining opposite-end boosted change current. The $i_{set2L}$ may be set to sense a high resistance fault at an end of the first DC transmission line t. That is, when a high resistance fault is generated at the end of the first DC transmission line, the direction action amount $i_{\Sigma\Delta}(t)$ of the first DC transmission line may be computed, and the $i_{set2L}$ may be acquired by dividing the $i_{\Sigma\Delta}(t)$ by a constant greater than 1. The $\Delta i_M(k)$ may be the current change of the M side of the first DC transmission line at the time point k. $\Delta i_N(k - T_{tran})$ is the current change of the N side of the first DC transmission line at the time point k. The $\Delta i_N(k - T_{tran})$ may be the current change of the N side of the first DC transmission line at the time point k. The n may be the number of sampling points in the time period $t_0 \sim t$. $i_{set2H} > i_{set2L}$.

The first pole amplitude-comparison change current pole selecting criterion may be as follows.

$$\left|\sum_{k=t_0}^{t}\sum_{j=t_0}^{k} di_M(j)\right| > \sigma \cdot \left|\sum_{k=t_0}^{t}\sum_{j=t_0}^{k} di'_M(j)\right|.$$

The second pole amplitude-comparison change current pole selecting criterion may be as follows.

$$\left|\sum_{k=t_0}^{t}\sum_{j=t_0}^{k} di'_M(j)\right| > \sigma \cdot \left|\sum_{k=t_0}^{t}\sum_{j=t_0}^{k} di_M(j)\right|.$$

The ratio braked current pole selecting criterion of the first DC transmission line is as follows.

$$i_{\Sigma\Delta}(t) > \alpha i_{D\Delta}(t).$$

$$i_{D\Delta}(t) = \frac{1}{n}\left|\sum_{k=t_0}^{t}(\Delta i_M(k) - \Delta i_N(k - T_{tran}))\right|.$$

The $di_M(j)$ may be the current difference of the M side of the first DC transmission line at the time point j. The $di_{M'}(j)$ may be the current difference of the M side of the second DC transmission line at the time point j. The σ may be a pole selecting coefficient. σ>1. The $t_Σ(t)$ may be the difference accumulating action amount of the first DC transmission line at the time point t. The α may be a ratio braking coefficient. α>1. The $αi_{DΔ}(t)$ may be a directional braking quantity. $t_0 ≤ j ≤ k$. $t_0 ≤ k ≤ t$. The $t_s$ may be a sampling interval. The $T_{tran}$ may be a DC line transmission channel delay. The stage-wise current pole selecting criterion is met when the first pole amplitude-comparison change current pole selecting criterion is met at any time point within the time period $t_0 \sim t_f$. When the first pole amplitude-comparison change current pole selecting criterion and the second pole amplitude-comparison change current pole selecting criterion continue to be not met within the time period $t_0 \sim t_{limit}$, it may be determined that a bipolar fault occurs at the time point $t_{limit}$ and within the time period $t_{limit} \sim t_f$, and the stage-wise current pole selecting criterion is met. After the time point $t_f$, the result of the ratio braked current pole selecting criterion is taken as the result of the stage-wise current pole selecting criterion. The stage-wise current pole selecting criterion is met if the ratio braked current pole selecting criterion is met.

The difference accumulation large number preventing protection criterion may be as follows.

$$i_f(t) > i_{set3}.$$

$$i_f(t) = \frac{1}{n} \sum_{k=t_0}^{t} i'_\Delta(k).$$

$$i'_\Delta(k) = f(i_\Delta(k)).$$

$$i_\Delta(k) = |di_M(k)| + \Delta i_N(k - T_{tran}).$$

The $i_f(t)$ may be a large number preventing difference action amount. The $i_{set3}$ may be a large number preventing differential value set to sense a high resistance fault at an end of the first DC transmission line. That is, when a high resistance fault is generated at the end of the first DC transmission line, the large number preventing difference action amount $i_f(t)$ of the first DC transmission line may be computed, and the $i_{set3}$ may be acquired by dividing the $i_f(t)$ by a constant greater than 1. The $i_Δ'(k)$ may be a reverse difference quantity of the M side of the first DC transmission line at the time point k. The f may be a reverse method where the reverse difference quantity of the time point k is a product of $i_Δ(k)$ of a maximal absolute value within the time period $t_0 \sim t$ and $-v$, and the reverse difference quantity of another time point is $i_Δ(k)$ of the another time point. v>1. The $i_Δ(k)$ may be the difference quantity of the M side of the first DC transmission line at the time point k. The $di_M(k)$ may be the current difference of the M side of the first DC transmission line at the time point k. The $Δi_N(k-T_{tran})$ may be the current change of the N side of the first DC transmission line at the time point $k-T_{tran}$. $t_0 ≤ k ≤ t$. The $t_s$ may be the sampling interval. The $T_{tran}$ may be the DC line transmission channel delay.

The current change large number preventing protection criterion of the first DC transmission line is as follows.

$$|i_Z(k)| > i_{set4}.$$

$$i_Z(k) = \Delta i_M(k) + \Delta i_N(k - T_{tran}).$$

The $i_Z(k)$ may be the large number preventing change of the first DC transmission line at the time point k. The $i_{set4}$ may be a large number preventing change value set to sense a high resistance fault at an end of the first DC transmission line. That is, when a high resistance fault is generated at the end of the first DC transmission line, the large number preventing change $|i_Z(k)|$ of the first DC transmission line may be computed, and the $i_{set4}$ may be acquired by dividing $|i_Z(k)|$ by a constant greater than 1. The $Δi_M(k)$ may be the current change of the M side of the first DC transmission line at the time point $k-T_{tran}$. The $Δi_N(k-T_{tran})$ may be the current change of the N side of the first DC transmission line.

The method for protecting a DC transmission line by the system for protecting a DC transmission line based on pure current characteristics according to the present disclosure is the same, and achieves the same effect, as steps of the DC transmission line protection criteria described in the present disclosure, which is not repeated here.

With the method and system for protecting a DC transmission line based on pure current characteristics according to a technical solution of the present disclosure, a current of a DC transmission line is collected. A current difference and a current change of the line are determined. It is determined, according to the current difference and the current change of the line, whether a preset protection criterion is met, to determine whether to export a DC protection action. With the method and system for protecting a DC transmission line based on pure current characteristics according to the present disclosure, the speed of a protection action against a metallic fault is further increased, greatly increasing the speed of a protection action against a high resistance fault. The protection is reliable and does not act in case of a lightning strike or an abnormal large number. The non-fault pole line protection is reliable and does not malfunction under in case of a single-pole grounding fault, improving DC transmission line protection performance comprehensively.

Unless defined otherwise, all terms used in the present disclosure are to be interpreted according to their common meanings in the technical field. Unless explained otherwise, all references to "a/an/said/the [device, component, etc.]" are to be interpreted as at least one example of said device, component, etc. Unless explained, it is not necessary to perform the steps of any method disclosed here in the exact order disclosed.

What is claimed is:

1. A method for protecting a Direct-Current (DC) transmission line based on pure current characteristics, comprising:

collecting a line current $i_M(k_0)$ of an M side of a first DC transmission line at a time point $k_0$ and a line current $i_M(k_0-t_s)$ of the M side of the first DC transmission line at a time point $k_0-t_s$, computing a current difference $di_M(k_0)$ of the M side of the first DC transmission line at the time point $k_0$ according to the line current $i_M(k_0)$ and the line current $i_M(k_0-t_s)$, and determining whether the current difference $di_M(k_0)$ meets a protection starting criterion, the first DC transmission line being one of transmission lines, the M side of the first DC transmission line being one of an inverter side and a rectifier side of the first DC transmission line, the $t_s$ being a sampling interval, the $k_0$ being greater than the $t_s$;

in response to the current difference $di_M(k_0)$ of the M side of the first DC transmission line at the time point $k_0$ meeting the protection starting criterion, starting DC protection at the M side of the first DC transmission line, collecting a line current $i_M(j)$ of the M side of the first DC transmission line at a time point j and a line current $i_M(j-t_s)$ of the M side of the first DC transmission line at a time point $j-t_s$, and computing a current difference $di_M(j)$ of the M side of the first DC transmission line at the time point j according to the line current $i_M(j)$ and the line current $i_M(j-t_s)$; collecting a line current $i_M(k)$ of the M side of the first DC transmission line at a time point k and a line current $i_M(k-t_s)$ of the M side of the first DC transmission line at a time point $k-t_s$, and computing a current difference $di_M(k)$ of the M side of the first DC transmission line at the time point k according to the line current $i_M(k)$ and the line current $i_M(k-t_s)$; collecting a line current $i_N(j-T_{tran})$ of an N side of the first DC transmission line at a time point $j-T_{tran}$ and a line current $i_N(j-t_s-T_{tran})$ of the N side of the first DC transmission line at a time point $j-t_s-T_{tran}$, and computing a current difference $di_N(j-T_{tran})$ of the N side of the first DC transmission line at the time point $j-T_{tran}$ according to the line current $i_N(j-T_{tran})$ and the line current $i_N(j-t_s-T_{tran})$; collecting a line current $i_M'(j)$ of an M side of a second DC transmission line at the time point j and a line current $i_M'(j-t_s)$ of the M side of the second DC transmission line at a time point $j-t_s$, computing a current difference $di_M'(j)$ of the M side of the second DC transmission line at the time point j according to the line current $i_M'(j)$ and the line current $i_M'(j-t_s)$, computing a current change $\Delta i_M(k)$ of the M side of the first DC transmission line at the time point k according to the current difference $di_M(j)$ of the M side of the first DC transmission line, and computing a current change $\Delta i_N(k-T_{tran})$ of the N side of the first DC transmission line at the time point $k-T_{tran}$ according to the current difference $di_N(j-T_{tran})$ of the N side of the first DC transmission line, the time point of starting DC protection at the M side of the first DC transmission line being denoted as $t_0$, the second DC transmission line being a DC transmission line other than the first DC transmission line, the M side of the second DC transmission line being located on a same side as the M side of the first DC transmission line, the N side of the first DC transmission line being opposite the M side of the first DC transmission line, the $T_{tran}$ being a DC line transmission channel delay, $t_0 \le j \le k$;

computing a difference accumulating action amount $i_\Sigma(t)$ of the first DC transmission line according to the current difference $di_M(k)$ of the M side of the first DC transmission line and the current change $\Delta i_N(k-T_{tran})$ of the N side of the first DC transmission line, computing a difference accumulating threshold $i_{setz}$ of the first DC transmission line according to the current difference $di_M(k)$ of the M side of the first DC transmission line, and determining whether the difference accumulating action amount $i_\Sigma(t)$ of the first DC transmission line and the difference accumulating threshold $i_{setz}$ of the first DC transmission line meet an opposite-end boosted differential current accumulation criterion preset, the t being a data collecting time point after start of DC protection at the M side of the first DC transmission line, $t_0 \le k \le t$;

computing a direction action amount $i_{\Sigma A}(t)$ of the first DC transmission line according to the current change $\Delta i_M(k)$ of the M side of the first DC transmission line and the current change $\Delta i_N(k-T_{tran})$ of the N side of the first DC transmission line, and determining whether the direction action amount $i_{\Sigma A}(t)$ of the first DC transmission line meets an accumulation low value direction criterion of an opposite-end boosted change current and an accumulation high value direction criterion of the opposite-end boosted change current preset;

determining, within a time period $t_0 \sim t_{limit}$, whether the current difference $di_M(j)$ of the M side of the first DC transmission line and the current difference $di_{M'}(j)$ of the M side of the second DC transmission line meet a first pole amplitude-comparison change current pole selecting criterion and a second pole amplitude-comparison change current pole selecting criterion preset, determining, within a time period $t_0 \sim t_f$, whether the current difference $di_M(j)$ of the M side of the first DC transmission line meets the first pole amplitude-comparison change current pole selecting criterion preset, determining, after the time point $t_f$, whether the direction action amount $i_{\Sigma A}(t)$ of the first DC transmission line meets a ratio braked current pole selecting criterion, wherein in response to that the first pole amplitude-comparison change current pole selecting criterion and the second pole amplitude-comparison change current pole selecting criterion are not met within the time period $t_0 \sim t_{limit}$, that the first pole amplitude-comparison change current pole selecting criterion is met at one time point within the time period $t_0 \sim t_f$, or that the ratio braked current pole selecting criterion is met at a time point after the time point $t_f$, a stage-wise current pole selecting criterion is met, the first pole being the M side of the first DC transmission line, the second pole being the M side of the second DC transmission line, the $t_{limit}$ and the $t_f$ being two time points after the $t_0$, $t_f > t_{limit}$;

computing a difference quantity $i_\Delta(k)$ of the M side of the first DC transmission line at the time point k according to the current difference $di_M(k)$ of the M side of the first DC transmission line and the current change $\Delta i_N(k-T_{tran})$ of the N side of the first DC transmission line, determining a reverse difference quantity $i_\Delta'(k)$ of the M side of the first DC transmission line at the time point k based on the difference quantity $i_\Delta(k)$, and determining whether the reverse difference quantity $i_\Delta'(k)$ of the M side of the first DC transmission line meets a difference accumulation large number preventing protection criterion preset;

computing a large number preventing change $i_z(k)$ of the first DC transmission line at the time point k according to the current change $\Delta i_M(k)$ of the M side and the current change $\Delta i_N(k-T_{tran})$ of the N side of the first DC transmission line, and determining whether the large number preventing change $i_z(k)$ of the first DC transmission line meets a current change large number preventing protection criterion; and in response to that the opposite-end boosted differential current accumulation criterion, the accumulation high value direction criterion of the opposite-end boosted change current, and the difference accumulation large number preventing protection criterion are all met at the time point t, and within a time period $t_0 \sim t$ a number of sampling points meeting the current change large number preventing protection criterion is greater than a preset point number threshold and a number of sampling points not meeting the current change large number preventing protection criterion, or in response to that the opposite-end boosted differential current accumulation criterion, the accumulation low value direction criterion of the opposite-end boosted change current, the stage-wise current pole selecting criterion, and the difference accumulation large number preventing protection criterion are all met at the time point t, and within the time period $t_0$~t the number of sampling points meeting the current change large number preventing protection criterion is greater than the preset point number threshold and the number of sampling points not meeting the current change large number preventing protection criterion, exporting a protection action on the M side of the first DC transmission line.

2. The method of claim 1, wherein the current difference $di_M(k_0)$ of the M side of the first DC transmission line is computed by $$di_M(k_0) = i_M(k_0) - i_M(k_0 - t_s),$$

wherein the protection starting criterion is $$|di_M(k_0)| > i_{set0},$$

the $i_{set0}$ being a starting threshold, the $i_{set0}$ being set to sense a high resistance fault at an end of the first DC transmission line, the $i_{set0}$ being acquired by dividing $|di_M(k_0)|$ by a constant greater than 1 in case of occurrence of the high resistance fault at the end of the first DC transmission line.

3. The method of claim 1, wherein the current difference $di_M(j)$ of the M side of the first DC transmission line is computed by $$di_M(j) = i_M(j) - i_M(j - t_s),$$

wherein the current difference $di_M(k)$ of the M side of the first DC transmission line is computed by $$di_M(k) = i_M(k) - i_M(k - t_s),$$

wherein the current difference $di_N(j - T_{tran})$ of the N side of the first DC transmission line is computed by $$di_N(j - T_{tran}) = i_N(j - T_{tran}) - i_N(j - t_s - T_{tran}),$$

wherein the current difference $di_M'(j)$ of the M side of the second DC transmission line is computed by $$di_M'(j) = i_M'(j) - i_M'(j - t_s),$$

wherein the current change $\Delta i_M(k)$ of the M side of the first DC transmission line is computed by $$\Delta i_M(k) = \sum_{j=t_0}^{k} di_M(j),$$

wherein the current change $\Delta i_N(k - T_{tran})$ of the N side of the first DC transmission line is computed by $$\Delta i_N(k - T_{tran}) = \sum_{j=t_0}^{k} di_N(j - T_{tran}).$$

4. The method of claim 3, wherein the difference accumulating action amount $i_\Sigma(t)$ of the first DC transmission line is computed by $$i_\Sigma(t) = \frac{1}{n} \sum_{k=t_0}^{t} (|di_M(k)| + \Delta i_N(k - T_{tran})),$$

the n being a number of sampling points in the time period $t_0$~t, the $|di_M(k)|$ being an absolute value of the current difference $di_M(k)$ of the M side of the first DC transmission line at the time point k, wherein the difference accumulating threshold $i_{setz}$ of the first DC transmission line is computed by $$i_{setz} = k_k(i_{set1} + \gamma),$$

$$\gamma = \rho \sum_{k=t_0}^{t_0+T} di_M^-(k),$$

$$k_k = \lambda \frac{i_{set1}}{i_{set1} + \rho \sum_{k=t_0}^{t_0+T} di_M^-(k)},$$

$$\rho = \frac{i_{set1}}{\sqrt{\left(\frac{i_{set1}}{\rho_{max}}\right)^2 + \left(\sum_{k=t_0}^{t_0+T'} di_M^-(k)\right)^2}},$$

$$\begin{cases} di_M^-(k) = di_M(k) & di_M(k) < 0 \\ di_M^-(k) = 0 & di_M(k) \geq 0 \end{cases},$$

the $k_k$ being a reliability coefficient, the $i_{set1}$ being a fixed threshold, the $i_{set1}$ being a maximum value of the difference accumulating action amount within a time period $T_0$ after an out-of-zone metallic fault, the $\gamma$ being a floating threshold of a negative slope current, the $di_M^-(k)$ being the negative slope current, the T being a floating threshold computing window, the $\rho$ being a floating threshold coefficient, the $\rho_{max}$ being a proportionality constant, $\rho_{max} > 1$, the T' being a fixed computing window, T'>T, the $\lambda$ being a margin factor, $\lambda > 1$, wherein the opposite-end boosted differential current accumulation criterion is $$i_\Sigma(t) > i_{setz}.$$

5. The method of claim 3, wherein the direction action amount $i_{\Sigma\Delta}(t)$ of the first DC transmission line is computed by $$i_{\Sigma\Delta}(t) = \frac{1}{n} \sum_{k=t_0}^{t} (\Delta i_M(k) + \Delta i_N(k - T_{tran})),$$

the n being a number of sampling points in the time period $t_0$~t, wherein the accumulation high value direction criterion of the opposite-end boosted change current is $$i_{\Sigma\Delta}(t) > i_{set2H},$$

wherein the accumulation low value direction criterion of the opposite-end boosted change current is $$i_{\Sigma\Delta}(t) > i_{set2L},$$

the $i_{set2H}$ being a direction determining high value, the $i_{set2L}$ being a direction determining low value, the $i_{set2H}$ being set according to a metallic fault at an end of the second DC transmission line, the $i_{set2H}$ being acquired by multiplying the $i_{\Sigma\Delta}(t)$ by a constant greater than 1 in case of occurrence of the metallic fault at the end of the second DC transmission line, the $i_{set2L}$ being set to sense a high resistance fault at an end of the first DC transmission line, the $i_{set2L}$ being acquired by dividing the $i_{\Sigma\Delta}(t)$ by a constant greater than 1 in case of occurrence of the high resistance fault at the end of the first DC transmission line.

6. The method of claim 5, wherein the first pole amplitude-comparison change current pole selecting criterion is $$\left|\sum_{k=t_0}^{t}\sum_{j=t_0}^{k}di_M(j)\right| > \sigma \cdot \left|\sum_{k=t_0}^{t}\sum_{j=t_0}^{k}di'_M(j)\right|,$$

wherein the second pole amplitude-comparison change current pole selecting criterion is $$\left|\sum_{k=t_0}^{t}\sum_{j=t_0}^{k}di'_M(j)\right| > \sigma \cdot \left|\sum_{k=t_0}^{t}\sum_{j=t_0}^{k}di_M(j)\right|,$$

wherein in response to both the first pole amplitude-comparison change current pole selecting criterion and the second pole amplitude-comparison change current pole selecting criterion not being met in the time period $t_0 \sim t_{limit}$, it is determined that a bipolar fault occurs at the time point $t_{limit}$ and within the time period $t_{limit} \sim t_f$, and the stage-wise current pole selecting criterion is met, wherein the ratio braked current pole selecting criterion is $$i_{\Sigma\Delta}(t) > \alpha i_{D\Delta}(t),$$

$$i_{D\Delta}(t) = \frac{1}{n}\left|\sum_{k=t_0}^{t}(\Delta i_M(k) - \Delta i_N(k-T_{tran}))\right|,$$

the $\sigma$ being a pole selecting coefficient, $\sigma > 1$, the $\alpha$ being a ratio braking coefficient, $\alpha > 1$, the $\alpha i_{D\Delta}(t)$ being a directional braking quantity.

7. The method of claim 3, wherein the difference quantity $i_\Delta(k)$ of the M side of the first DC transmission line is computed by $$i_\Delta(k) = |di_M(k) + \Delta i_N(k-T_{tran})|,$$

wherein the reverse difference quantity $i_\Delta'(k)$ of the M side of the first DC transmission line is computed by $$i'_\Delta(k) = f(i_\Delta(k)),$$

the f being a reverse method where the reverse difference quantity of the time point k is a product of $i_\Delta(k)$ of a maximal absolute value within the time period $t_0 \sim t$ and $-v$, and the reverse difference quantity of a time point other than the time point k is $i_\Delta(k)$ of the time point other than the time point k, $v > 1$, wherein the difference accumulation large number preventing protection criterion is $$i_f(t) > i_{set3},$$

$$i_f(t) = \frac{1}{n}\sum_{k=t_0}^{t} i'_\Delta(k),$$

the $i_f(t)$ being a large number preventing difference action amount, the $i_{set3}$ being a large number preventing differential value, the $i_{set3}$ being set to sense a high resistance fault at an end of the first DC transmission line, the $i_{set3}$ being acquired by dividing the $i_f(t)$ by a constant greater than 1 in case of occurrence of the high resistance fault at the end of the first DC transmission line.

8. The method of claim 3, wherein the large number preventing change $i_z(k)$ of the first DC transmission line is computed by $$i_z Z(k) = \Delta i_M(k) + \Delta i_N(k-T_{tran}),$$

wherein the current change large number preventing protection criterion is $$|i_Z(k)| > i_{set4},$$

the $i_{set4}$ being a large number preventing change value, the $i_{set4}$ being set to sense a high resistance fault at an end of the first DC transmission line, the $i_{set4}$ being acquired by dividing the $|i_z(k)|$ by a constant greater than 1 in case of occurrence of the high resistance fault at the end of the first DC transmission line.

9. A system for protecting a Direct-Current (DC) transmission line based on pure current characteristics, comprising a processor and a memory configured to store instructions executable by the processor, wherein the processor is configured to implement:

collecting a line current $i_M(k_0)$ of an M side of a first DC transmission line at a time point $k_0$ and a line current $i_M(k_0-t_s)$ of the M side of the first DC transmission line at a time point $k_0-t_s$, computing a current difference $di_M(k_0)$ of the M side of the first DC transmission line at the time point $k_0$ according to the line current $i_M(k_0)$ and the line current $i_M(k_0-t_s)$, and determining whether the current difference $di_M(k_0)$ meets a protection starting criterion, the first DC transmission line being one of transmission lines, the M side of the first DC transmission line being one of an inverter side and a rectifier side of the first DC transmission line, the $t_s$ being a sampling interval, the $k_0$ being greater than the $t_s$;

in response to the current difference $di_M(k_0)$ of the M side of the first DC transmission line at the time point $k_0$ meeting the protection starting criterion, starting DC protection at the M side of the first DC transmission line, collecting a line current $i_M(j)$ of the M side of the first DC transmission line at a time point j and a line current $i_M(j-t_s)$ of the M side of the first DC transmission line at a time point $j-t_s$, and computing a current difference $di_M(j)$ of the M side of the first DC transmission line at the time point j according to the line current $i_M(j)$ and the line current $i_M(j-t_s)$; collecting a line current $i_M(k)$ of the M side of the first DC transmission line at a time point k and a line current $i_M(k-t_s)$ of the M side of the first DC transmission line at a time point $k-t_s$, and computing a current difference $di_M(k)$ of the M side of the first DC transmission line at the time point k according to the line current $i_M(k)$ and the line current $i_M(k-t_s)$; collecting a line current $i_N(j-T_{tran})$ of an N side of the first DC transmission line at a time point $j-T_{tran}$ and a line current $i_N(j-t_s-T_{tran})$ of the N side of the first DC transmission line at a time point $j-t_s-T_{tran}$, and computing a current difference $di_N(j-T_{tran})$ of the N side of the first DC transmission line at the time point $j-T_{tran}$ according to the line current $i_N(j-T_{tran})$ and the line current $i_N(j-t_s-T_{tran})$; collecting a line current $i_{M'}(j)$ of an M side of a second DC transmission line at the time point j and a line current $i_{M'}(j-t_s)$ of the M side of the second DC transmission line at a time point $j-t_s$, computing a current difference $di_M'(j)$ of the M side of the second DC transmission line at the time point j according to the line current $i_M'(j)$ and the line current $i_M'(j-t_s)$, computing a current change $i_M(k)$ of the M side of the first DC transmission line at the time point k according to the current difference $di_M(j)$ of the M side of the first DC transmission line, and computing a current change $\Delta i_N(k-T_{tran})$ of the N side of the first DC transmission line at the time point $k-T_{tran}$ according to the current difference $di_N(j-T_{tran})$ of the N side of the first DC transmission line, the time point of starting DC protection at the M side of the first DC transmission line being denoted as $t_0$, the second DC transmission line being a DC transmission line other than the first DC transmission line, the M side of the second DC transmission line being located on a same side as the M side of the first DC transmission line, the N side of the first DC transmission line being opposite the M side of the first DC transmission line, the $T_{tran}$ being a DC line transmission channel delay, $t_0 \leq j \leq k$;

computing a difference accumulating action amount $i_\Sigma(t)$ of the first DC transmission line according to the current difference $di_M(k)$ of the M side of the first DC transmission line and the current change $\Delta i_N(k-T_{tran})$ of the N side of the first DC transmission line, computing a difference accumulating threshold $i_{setz}$ of the first DC transmission line according to the current difference $di_M(k)$ of the M side of the first DC transmission line, and determining whether the difference accumulating action amount $i_\Sigma(t)$ of the first DC transmission line and the difference accumulating threshold $i_{setz}$ of the first DC transmission line meet an opposite-end boosted differential current accumulation criterion preset, the t being a data collecting time point after start of DC protection at the M side of the first DC transmission line, $t_0 \leq k \leq t$;

computing a direction action amount $i_{\Sigma A}(t)$ of the first DC transmission line according to the current change $\Delta i_M(k)$ of the M side of the first DC transmission line and the current change $\Delta i_N(k-T_{tran})$ of the N side of the first DC transmission line, and determining whether the direction action amount $i_{\Sigma A}(t)$ of the first DC transmission line meets an accumulation low value direction criterion of an opposite-end boosted change current and an accumulation high value direction criterion of the opposite-end boosted change current preset;

determining, within a time period $t_0 \sim t_{limit}$, whether the current difference $di_M(j)$ of the M side of the first DC transmission line and the current difference $di_M'(j)$ of the M side of the second DC transmission line meet a first pole amplitude-comparison change current pole selecting criterion and a second pole amplitude-comparison change current pole selecting criterion preset, determining, within a time period $t_0 \sim t_f$, whether the current difference $di_M(j)$ of the M side of the first DC transmission line meets the first pole amplitude-comparison change current pole selecting criterion preset, determining, after the time point $t_f$, whether the direction action amount $i_{\Sigma A}(t)$ of the first DC transmission line meets a ratio braked current pole selecting criterion, wherein in response to that the first pole amplitude-comparison change current pole selecting criterion and the second pole amplitude-comparison change current pole selecting criterion are not met within the time period $t_0 \sim t_{limit}$, that the first pole amplitude-comparison change current pole selecting criterion is met at one time point within the time period $t_0 \sim t_f$ or that the ratio braked current pole selecting criterion is met at a time point after the time point $t_f$, a stage-wise current pole selecting criterion is met, the first pole being the M side of the first DC transmission line, the second pole being the M side of the second DC transmission line, the $t_{limit}$ and the $t_f$ being two time points after the $t_0$, $t_f > t_{limit}$;

computing a difference quantity $i_A(k)$ of the M side of the first DC transmission line at the time point k according to the current difference $di_M(k)$ of the M side of the first DC transmission line and the current change $\Delta i_N(k-T_{tran})$ of the N side of the first DC transmission line, determining a reverse difference quantity $i_A'(k)$ of the M side of the first DC transmission line at the time point k based on the difference quantity $i_A(k)$, and determining whether the reverse difference quantity $i_A'(k)$ of the M side of the first DC transmission line meets a difference accumulation large number preventing protection criterion preset, computing a large number preventing change $i_z(k)$ of the first DC transmission line at the time point k according to the current change $\Delta i_M(k)$ of the M side and the current change $\Delta i_N(k-T_{tran})$ of the N side of the first DC transmission line, and determining whether the large number preventing change $i_z(k)$ of the first DC transmission line meets a current change large number preventing protection criterion; and in response to that the opposite-end boosted differential current accumulation criterion, the accumulation high value direction criterion of the opposite-end boosted change current, and the difference accumulation large number preventing protection criterion are all met at the time point t, and within a time period $t_0-t$ a number of sampling points meeting the current change large number preventing protection criterion is greater than a preset point number threshold and a number of sampling points not meeting the current change large number preventing protection criterion, or in response to that the opposite-end boosted differential current accumulation criterion, the accumulation low value direction criterion of the opposite-end boosted change current, the stage-wise current pole selecting criterion, and the difference accumulation large number preventing protection criterion are all met at the time point t, and within the time period $t_0 \sim t$ the number of sampling points meeting the current change large number preventing protection criterion is greater than the preset point number threshold and the number of sampling points not meeting the current change large number preventing protection criterion, exporting a protection action on the M side of the first DC transmission line.

10. The system of claim 9, wherein the current differenced $di_M(k_0)$ of the M side of the first DC transmission line is computed by $$di_M(k_0)=i_M(k_0)-i_M(k_0-t_s),$$

wherein the protection starting criterion is $$|di_M(k_0)|>i_{set0},$$

the $i_{set0}$ being a starting threshold, the $i_{set0}$ being set to sense a high resistance fault at an end of the first DC transmission line, the $i_{set0}$ being acquired by dividing $|di_M(k_0)|$ by a constant greater than 1 in case of occurrence of the high resistance fault at the end of the first DC transmission line.

11. The system of claim 9, wherein the current difference $di_M(j)$ of the M side of the first DC transmission line is computed by $$di_M(j) = i_M(j) - i_M(j-t_s),$$

wherein the current difference $di_M(k)$ of the M side of the first DC transmission line is computed by $$di_M(k) = i_M(k) - i_M(k-t_s),$$

wherein the current difference $di_N(j-T_{tran})$ of the N side of the first DC transmission line is computed by $$di_N(j-T_{tran}) = i_N(j-T_{tran}) - i_N(j-t_s-T_{tran}),$$

wherein the current difference $di_M'(j)$ of the M side of the second DC transmission line is computed by $$di_M'(j) = i_M'(j) - i_M'(j-t_s),$$

wherein the current change $\Delta i_M(k)$ of the M side of the first DC transmission line is computed by $$\Delta i_M(k) = \sum_{j=t_0}^{k} di_M(j),$$

wherein the current change $\Delta i_N(k-T_{tran})$ of the N side of the first DC transmission line is computed by $$\Delta i_N(k - T_{tran}) = \sum_{j=t_0}^{k} di_N(j - T_{tran}).$$

12. The system of claim 11, wherein the difference accumulating action amount $i_\Sigma(t)$ of the first DC transmission line is computed by $$i_\Sigma(t) = \frac{1}{n} \sum_{k=t_0}^{t} (|di_M(k)| + \Delta i_N(k - T_{tran})),$$

the n being a number of sampling points in the time period $t_0 \sim t$, the $|di_M(k)|$ being an absolute value of the current difference $di_M(k)$ of the M side of the first DC transmission line at the time point k,
wherein the difference accumulating threshold $i_{setz}$ of the first DC transmission line is computed by $$i_{setz} = k_k(i_{set1} + \gamma),$$

$$\gamma = \rho \sum_{k=t_0}^{t_0+T} d\bar{i}_M(k),$$

$$k_k = \lambda \frac{i_{set1}}{i_{set1} + \rho \sum_{k=t_0}^{t_0+T'} d\bar{i}_M(k)},$$

$$\rho = \frac{i_{set1}}{\sqrt{\left(\frac{i_{set1}}{\rho_{max}}\right)^2 + \left(\sum_{k=t_0}^{t_0+T'} d\bar{i}_M(k)\right)^2}},$$

$$\begin{cases} d\bar{i}_M^-(k) = di_M(k) & di_M(k) < 0 \\ d\bar{i}_M^-(k) = 0 & di_M(k) \geq 0 \end{cases},$$

the $k_k$ being a reliability coefficient, the $i_{set1}$ being a fixed threshold, the $i_{set1}$ being a maximum value of the difference accumulating action amount within a time period $T_0$ after an out-of-zone metallic fault, the $\gamma$ being a floating threshold of a negative slope current, the $d\bar{i}_M^-(k)$ being the negative slope current, the T being a floating threshold computing window, the $\rho$ being a floating threshold coefficient, the $\rho max$ being a proportionality constant, $\rho_{max} > 1$, the T' being a fixed computing window, T'>T, the $\lambda$ being a margin factor, $\lambda > 1$,
wherein the opposite-end boosted differential current accumulation criterion is $$i_\Sigma(t) > i_{setz}.$$

13. The system of claim 11, wherein the direction action amount $i_{\Sigma\Delta}(t)$ of the first DC transmission line is computed by $$i_{\Sigma\Delta}(t) = \frac{1}{n} \sum_{k=t_0}^{t} (\Delta i_M(k) + \Delta i_N(k - T_{tran})),$$

the n being a number of sampling points in the time period $t_0 \sim t$,
wherein the accumulation high value direction criterion of the opposite-end boosted change current is $$i_{\Sigma\Delta}(t) > i_{set2H},$$

wherein the accumulation low value direction criterion of the opposite-end boosted change current is $$i_{\Sigma\Delta}(t) > i_{set2L},$$

the $i_{set2H}$ being a direction determining high value, the $i_{set2L}$ being a direction determining low value, the $i_{set2H}$ being set according to a metallic fault at an end of the second DC transmission line, the $i_{set2H}$ being acquired by multiplying the $i_{\Sigma\Delta}(t)$ by a constant greater than 1 in case of occurrence of the metallic fault at the end of the second DC transmission line, the $i_{set2L}$ being set to sense a high resistance fault at an end of the first DC transmission line, the $i_{set2L}$ being acquired by dividing the $i_{\Sigma\Delta}(t)$ by a constant greater than 1 in case of occurrence of the high resistance fault at the end of the first DC transmission line.

14. The system of claim 13, wherein the first pole amplitude-comparison change current pole selecting criterion is $$\left|\sum_{k=t_0}^{t} \sum_{j=t_0}^{k} di_M(j)\right| > \sigma \cdot \left|\sum_{k=t_0}^{t} \sum_{j=t_0}^{k} di_M'(j)\right|,$$

wherein the second pole amplitude-comparison change current pole selecting criterion is $$\left|\sum_{k=t_0}^{t} \sum_{j=t_0}^{k} di_M'(j)\right| > \sigma \cdot \left|\sum_{k=t_0}^{t} \sum_{j=t_0}^{k} di_M(j)\right|,$$

wherein in response to both the first pole amplitude-comparison change current pole selecting criterion and the second pole amplitude-comparison change current pole selecting criterion not being met in the time period $t_0 \sim t_{limit}$, it is determined that a bipolar fault occurs at the time point $t_{limit}$ and within the time period $t_{limit} \sim t_f$, and the stage-wise current pole selecting criterion is met, wherein the ratio braked current pole selecting criterion is $$i_{\Sigma\Delta}(t) > \alpha i_{D\Delta}(t),$$

$$i_{D\Delta}(t) = \frac{1}{n}\left|\sum_{k=t_0}^{t}(\Delta i_M(k) - \Delta i_N(k - T_{tran}))\right|,$$

the $\sigma$ being a pole selecting coefficient, $\sigma > 1$, the $\alpha$ being a ratio braking coefficient, $\alpha > 1$, the $\alpha i_{D\Delta}(t)$ being a directional braking quantity.

15. The system of claim 11, wherein the difference quantity $i_\Delta(k)$ of the M side of the first DC transmission line is computed by $$i_\Delta(k) = |di_M(k)| + \Delta i_N(k - T_{tran}),$$

wherein the reverse difference quantity $i_\Delta'(k)$ of the M side of the first DC transmission line is computed by $$i'_\Delta(k) = f(i_\Delta(k)),$$

the f being a reverse method where the reverse difference quantity of the time point k is a product of $i_\Delta(k)$ of a maximal absolute value within the time period $t_0 \sim t$ and $-v$, and the reverse difference quantity of a time point other than the time point k is $i_\Delta(k)$ of the time point other than the time point k, $v > 1$, wherein the difference accumulation large number preventing protection criterion is $$i_f(t) > i_{set3},$$

$$i_f(t) = \frac{1}{n}\sum_{k=t_0}^{t}i'_\Delta(k),$$

the $i_f(t)$ being a large number preventing difference action amount, the $i_{set3}$ being a large number preventing differential value, the $i_{set3}$ being set to sense a high resistance fault at an end of the first DC transmission line, the $i_{set3}$ being acquired by dividing the $i_f(t)$ by a constant greater than 1 in case of occurrence of the high resistance fault at the end of the first DC transmission line.

16. The system of claim 11, wherein the large number preventing change $i_z(k)$ of the first DC transmission line is computed by $$i_Z(k) = \Delta i_M(k) + \Delta i_N(k - T_{tran}),$$

wherein the current change large number preventing protection criterion is $$|i_Z(k)| > i_{set4},$$

the $i_{set4}$ being a large number preventing change value, the $i_{set4}$ being set to sense a high resistance fault at an end of the first DC transmission line, the $i_{set4}$ being acquired by dividing the $|i_z(k)|$ by a constant greater than 1 in case of occurrence of the high resistance fault at the end of the first DC transmission line.

17. A non-transitory computer-readable storage medium, having stored thereon instructions which when executed by a processor of a computer, allow the computer to perform:

collecting a line current $i_M(k_0)$ of an M side of a first DC transmission line at a time point $k_0$ and a line current $i_M(k_0-t_s)$ of the M side of the first DC transmission line at a time point $k_0-t_s$, computing a current difference $di_M(k_0)$ of the M side of the first DC transmission line at the time point $k_0$ according to the line current $i_M(k_0)$ and the line current $i_M(k_0-t_s)$, and determining whether the current difference $di_M(k_0)$ meets a protection starting criterion, the first DC transmission line being one of transmission lines, the M side of the first DC transmission line being one of an inverter side and a rectifier side of the first DC transmission line, the $t_s$ being a sampling interval, the $k_0$ being greater than the $t_s$;

in response to the current difference $di_M(k_0)$ of the M side of the first DC transmission line at the time point $k_0$ meeting the protection starting criterion, starting DC protection at the M side of the first DC transmission line, collecting a line current $i_M(j)$ of the M side of the first DC transmission line at a time point j and a line current $i_M(j-t_s)$ of the M side of the first DC transmission line at a time point $j-t_s$, and computing a current difference $di_M(j)$ of the M side of the first DC transmission line at the time point j according to the line current $i_M(j)$ and the line current $i_M(j-t_s)$; collecting a line current $i_M(k)$ of the M side of the first DC transmission line at a time point k and a line current $i_M(k-t_s)$ of the M side of the first DC transmission line at a time point $k-t_s$, and computing a current difference $di_M(k)$ of the M side of the first DC transmission line at the time point k according to the line current $i_M(k)$ and the line current $i_M(k-t_s)$; collecting a line current $i_N(j-T_{tran})$ of an N side of the first DC transmission line at a time point $j-T_{tran}$ and a line current $i_N(j-t_s-T_{tran})$ of the N side of the first DC transmission line at a time point $j-t_s-T_{tran}$, and computing a current difference $di_N(j-T_{tran})$ of the N side of the first DC transmission line at the time point $j-T_{tran}$ according to the line current $i_N(j-T_{tran})$ and the line current $i_N(j-t_s-T_{tran})$; collecting a line current $i_M'(j)$ of an M side of a second DC transmission line at the time point j and a line current $i_M'(j-t_s)$ of the M side of the second DC transmission line at a time point $j-t_s$, computing a current difference $di_M'(j)$ of the M side of the second DC transmission line at the time point j according to the line current $i_M'(j)$ and the line current $i_M'(j-t_s)$, computing a current change $\Delta i_M(k)$ of the M side of the first DC transmission line at the time point k according to the current difference $di_M(j)$ of the M side of the first DC transmission line, and computing a current change $\Delta i_N(k-T_{tran})$ of the N side of the first DC transmission line at the time point $k-T_{tran}$ according to the current difference $di_N(j-T_{tran})$ of the N side of the first DC transmission line, the time point of starting DC protection at the M side of the first DC transmission line being denoted as $t_0$, the second DC transmission line being a DC transmission line other than the first DC transmission line, the M side of the second DC transmission line being located on a same side as the M side of the first DC transmission line, the N side of the first DC transmission line being opposite the M side of the first DC transmission line, the $T_{tran}$ being a DC line transmission channel delay, $t_0 \leq j \leq k$;

computing a difference accumulating action amount $i_\Sigma(t)$ of the first DC transmission line according to the current difference $di_M(k)$ of the M side of the first DC transmission line and the current change $\Delta i_N(k-T_{tran})$ of the N side of the first DC transmission line, computing a difference accumulating threshold $i_{setz}$ of the first DC transmission line according to the current difference $di_M(k)$ of the M side of the first DC transmission line, and determining whether the difference accumulating action amount $i_\Sigma(t)$ of the first DC transmission line and the difference accumulating threshold $i_{setz}$ of the first DC transmission line meet an opposite-end boosted differential current accumulation criterion preset, the t being a data collecting time point after start of DC protection at the M side of the first DC transmission line, $t_0 \le k \le t$;

computing a direction action amount $i_{\Sigma\Delta}(t)$ of the first DC transmission line according to the current change $\Delta i_M(k)$ of the M side of the first DC transmission line and the current change $\Delta i_N(k-T_{tran})$ of the N side of the first DC transmission line, and determining whether the direction action amount $i_{\Sigma\Delta}(t)$ of the first DC transmission line meets an accumulation low value direction criterion of an opposite-end boosted change current and an accumulation high value direction criterion of the opposite-end boosted change current preset;

determining, within a time period $t_0 \sim t_{limit}$, whether the current difference $di_M(j)$ of the M side of the first DC transmission line and the current difference $di_M'(j)$ of the M side of the second DC transmission line meet a first pole amplitude-comparison change current pole selecting criterion and a second pole amplitude-comparison change current pole selecting criterion preset, determining, within a time period $t_0 \sim t_f$ whether the current difference $di_M(j)$ of the M side of the first DC transmission line meets the first pole amplitude-comparison change current pole selecting criterion preset, determining, after the time point $t_f$ whether the direction action amount $i_{\Sigma\Delta}(t)$ of the first DC transmission line meets a ratio braked current pole selecting criterion, wherein in response to that the first pole amplitude-comparison change current pole selecting criterion and the second pole amplitude-comparison change current pole selecting criterion are not met within the time period $t_0 \sim t_{limit}$, that the first pole amplitude-comparison change current pole selecting criterion is met at one time point within the time period $t_0 \sim t_f$ or that the ratio braked current pole selecting criterion is met at a time point after the time point $t_f$, a stage-wise current pole selecting criterion is met, the first pole being the M side of the first DC transmission line, the second pole being the M side of the second DC transmission line, the $t_{limit}$ and the $t_f$ being two time points after the $t_0$, $t_f > t_{limit}$;

computing a difference quantity $i_\Delta(k)$ of the M side of the first DC transmission line at the time point k according to the current difference $di_M(k)$ of the M side of the first DC transmission line and the current change $\Delta i_N(k-T_{tran})$ of the N side of the first DC transmission line, determining a reverse difference quantity $i_\Delta'(k)$ of the M side of the first DC transmission line at the time point k based on the difference quantity $i_\Delta(k)$, and determining whether the reverse difference quantity $i_\Delta'(k)$ of the M side of the first DC transmission line meets a difference accumulation large number preventing protection criterion preset;

computing a large number preventing change $i_z(k)$ of the first DC transmission line at the time point k according to the current change $\Delta i_M(k)$ of the M side and the current change $\Delta i_N(k-T_{tran})$ of the N side of the first DC transmission line, and determining whether the large number preventing change $i_z(k)$ of the first DC transmission line meets a current change large number preventing protection criterion; and in response to that the opposite-end boosted differential current accumulation criterion, the accumulation high value direction criterion of the opposite-end boosted change current, and the difference accumulation large number preventing protection criterion are all met at the time point t, and within a time period $t_0 \sim t$ a number of sampling points meeting the current change large number preventing protection criterion is greater than a preset point number threshold and a number of sampling points not meeting the current change large number preventing protection criterion, or in response to that the opposite-end boosted differential current accumulation criterion, the accumulation low value direction criterion of the opposite-end boosted change current, the stage-wise current pole selecting criterion, and the difference accumulation large number preventing protection criterion are all met at the time point t, and within the time period $t_0 \sim t$ the number of sampling points meeting the current change large number preventing protection criterion is greater than the preset point number threshold and the number of sampling points not meeting the current change large number preventing protection criterion, exporting a protection action on the M side of the first DC transmission line.

18. The storage medium of claim 17, wherein the current difference $di_M(k_0)$ of the M side of the first DC transmission line is computed by $$di_M(k_0) = i_M(k_0) - i_M(k_0 - t_s),$$

wherein the protection starting criterion is $$|di_M(k_0)| > i_{set0},$$

the $i_{set0}$ being a starting threshold, the $i_{set0}$ being set to sense a high resistance fault at an end of the first DC transmission line, the $i_{set0}$ being acquired by dividing $|di_M(k_0)|$ by a constant greater than 1 in case of occurrence of the high resistance fault at the end of the first DC transmission line.

19. The storage medium of claim 17, wherein the current difference $di_M(j)$ of the M side of the first DC transmission line is computed by $$di_M(j) = i_M(j) - i_M(j - t_s),$$

wherein the current difference $di_M(k)$ of the M side of the first DC transmission line is computed by $$di_M(k) = i_M(k) - i_M(k - t_s),$$

wherein the current difference $di_N(j - T_{tran})$ of the N side of the first DC transmission line is computed by $$di_N(j - T_{tran}) = i_N(j - T_{tran}) - i_N(j - t_s - T_{tran}),$$

wherein the current difference $di_M'(j)$ of the M side of the second DC transmission line is computed by $$di_M'(j) = i_M'(j) - i_M'(j - t_s),$$

wherein the current change $\Delta i_M(k)$ of the M side of the first DC transmission line is computed by $$\Delta i_M(k) = \sum_{j=t_0}^{k} di_M(j),$$

wherein the current change $\Delta i_N(k-T_{tran})$ of the N side of the first DC transmission line is computed by $$\Delta i_N(k - T_{tran}) = \sum_{j=t_0}^{k} di_N(j - T_{tran}).$$

20. The storage medium of claim 19, wherein the difference accumulating action amount $i_\Sigma(t)$ of the first DC transmission line is computed by $$i_\Sigma(t) = \frac{1}{n} \sum_{k=t_0}^{t} (|di_M(k)| + \Delta i_N(k - T_{tran})),$$

the n being a number of sampling points in the time period $t_0 \sim t$, the $|di_M(k)|$ being an absolute value of the current difference $di_M(k)$ of the M side of the first DC transmission line at the time point k, wherein the difference accumulating threshold $i_{setz}$ of the first DC transmission line is computed by $$i_{setz} = k_k(i_{set1} + \gamma),$$

$$\gamma = \rho \sum_{k=t_0}^{t_0+T} di_M^-(k),$$

$$k_k = \lambda \frac{i_{set1}}{i_{set1} + \rho \sum_{k=t_0}^{t_0+T'} di_M^-(k)},$$

$$\rho = \frac{i_{set1}}{\sqrt{\left(\frac{i_{set1}}{\rho_{max}}\right)^2 + \left(\sum_{k=t_0}^{t_0+T'} di_M^-(k)\right)^2}},$$

$$\begin{cases} di_M^-(k) = di_M(k) & di_M(k) < 0 \\ di_M^-(k) = 0 & di_M(k) \geq 0 \end{cases},$$

the $k_k$ being a reliability coefficient, the $i_{set1}$ being a fixed threshold, the $i_{set1}$ being a maximum value of the difference accumulating action amount within a time period $T_0$ after an out-of-zone metallic fault, the $\gamma$ being a floating threshold of a negative slope current, the $di_M^-(k)$ being the negative slope current, the T being a floating threshold computing window, the $\rho$ being a floating threshold coefficient, the $\rho_{max}$ being a proportionality constant, $\rho_{max} > 1$, the T' being a fixed computing window, T'>T, the $\lambda$ being a margin factor, $\lambda > 1$, wherein the opposite-end boosted differential current accumulation criterion is $$i_\Sigma(t) > i_{setz}.$$

* * * * *